US012561541B2

(12) United States Patent
Xing et al.

(10) Patent No.: US 12,561,541 B2
(45) Date of Patent: Feb. 24, 2026

(54) TWO-DIMENSIONAL CODE DISPLAY METHOD, APPARATUS, DEVICE, AND MEDIUM

(71) Applicant: BEIJING BYTEDANCE NETWORK TECHNOLOGY CO., LTD., Beijing (CN)

(72) Inventors: Tong Xing, Beijing (CN); Sike Rong, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/538,865

(22) Filed: Nov. 30, 2021

(65) Prior Publication Data

US 2022/0215192 A1 Jul. 7, 2022

(30) Foreign Application Priority Data

Jan. 6, 2021 (CN) .......................... 202110014589.0

(51) Int. Cl.
*G06K 7/14* (2006.01)
*G06V 10/10* (2022.01)
*G06V 10/56* (2022.01)

(52) U.S. Cl.
CPC ......... *G06K 7/1417* (2013.01); *G06K 7/1443* (2013.01); *G06V 10/19* (2022.01); *G06V 10/56* (2022.01)

(58) Field of Classification Search
CPC .... G06V 10/56; G06V 30/2247; G06V 10/19; G06K 7/1443; G06K 7/1417; G06K 1/00; G06K 1/12
See application file for complete search history.

(56) References Cited

U.S. PATENT DOCUMENTS 5,471,533 A * 11/1995 Wang ................. H04N 1/00968
283/73
5,814,806 A * 9/1998 Tanaka ............. G06K 19/06028
235/494

(Continued)

FOREIGN PATENT DOCUMENTS

CN 101430768 A 5/2009
CN 101477638 A 7/2009

(Continued)

OTHER PUBLICATIONS

Notice of Allowance in CN Application No. 202110014589.0 mailed Aug. 22, 2022 (4 pages).

(Continued)

*Primary Examiner* — Daniel I Walsh

(57) ABSTRACT

The present disclosure relates to a two-dimensional (2D) code display method, apparatus, device, and medium. The 2D code display method includes: receiving a 2D code display operation for triggering display of a 2D code image corresponding to a target content, wherein the target content belongs to a first application; in response to the 2D code display operation, displaying the 2D code image including a first primary positioning point and a second primary positioning point that are arranged to overlap, wherein the first primary positioning point is above the second primary positioning point and has a preset color, and wherein the second primary positioning point has a representative color of the first application.

14 Claims, 10 Drawing Sheets

S210

Receiving a 2D code display operation for triggering display of a 2D code image corresponding to a target content, wherein the target content belongs to a first application

S220

In response to the 2D code display operation, displaying the 2D code image including a first primary positioning point and a second primary positioning point that are arranged to overlap, wherein the first primary positioning point is above the second primary positioning point and has a preset color, and wherein the second primary positioning point has a representative color of the first application

(56) References Cited

U.S. PATENT DOCUMENTS

| | | | | |
|---|---|---|---|---|
| 6,398,117 | B1* | 6/2002 | Oakeson | G06K 19/06056 235/494 |
| 6,572,025 | B1* | 6/2003 | Nishikado | G06K 19/06028 235/494 |
| 8,215,565 | B2* | 7/2012 | Howard | G06K 19/06037 235/494 |
| 10,789,519 | B1* | 9/2020 | Wang | G06Q 20/4014 |
| 10,936,837 | B1* | 3/2021 | Deacon | G06K 19/06037 |
| 11,468,255 | B2* | 10/2022 | Xu | G06K 7/015 |
| 11,556,727 | B1* | 1/2023 | Geisler | G06K 7/1417 |
| 12,424,003 | B2* | 9/2025 | Motosugi | G06V 20/95 |
| 2006/0097062 | A1* | 5/2006 | Cheong | G06K 7/1408 235/494 |
| 2006/0251260 | A1* | 11/2006 | Kitayama | H04S 7/302 381/1 |
| 2006/0282500 | A1* | 12/2006 | Kiuchi | H04L 67/12 709/203 |
| 2008/0267537 | A1* | 10/2008 | Thuries | G06K 7/1095 382/321 |
| 2010/0082491 | A1* | 4/2010 | Rosenblatt | G06Q 20/10 705/13 |
| 2010/0116888 | A1* | 5/2010 | Asami | G06K 7/1095 235/462.11 |
| 2010/0277330 | A1* | 11/2010 | Gentilini | G06K 7/10881 340/679 |
| 2012/0290336 | A1* | 11/2012 | Rosenblatt | G06Q 30/02 705/5 |
| 2013/0021364 | A1* | 1/2013 | Azuma | G06K 19/06103 345/589 |
| 2014/0224879 | A1* | 8/2014 | Guigan | G06K 7/1456 235/494 |
| 2015/0043043 | A1* | 2/2015 | Hayano | H04N 1/21 358/474 |
| 2016/0065649 | A1* | 3/2016 | Ou | G06F 3/1423 709/217 |
| 2017/0169270 | A1* | 6/2017 | Muto | G06K 7/1095 |
| 2018/0025263 | A1* | 1/2018 | Toyoizumi | G06K 19/0614 235/494 |
| 2018/0189535 | A1* | 7/2018 | Ishida | G06K 7/1413 |
| 2019/0043151 | A1* | 2/2019 | Arce | G06K 19/06103 |
| 2019/0126660 | A1* | 5/2019 | Dorier | C09D 11/037 |
| 2019/0219454 | A1* | 7/2019 | Tokuda | G06K 7/14 |
| 2019/0279246 | A1* | 9/2019 | Kwak | G06Q 10/02 |
| 2019/0294775 | A1* | 9/2019 | Okabe | G06F 21/35 |
| 2019/0372769 | A1* | 12/2019 | Fisher | G06K 7/1417 |
| 2020/0005083 | A1* | 1/2020 | Collins | G06V 20/64 |
| 2020/0074129 | A1* | 3/2020 | Shen | G06F 21/10 |
| 2020/0184169 | A1* | 6/2020 | Scholl | G09C 5/00 |
| 2021/0056275 | A1* | 2/2021 | Chen | G06K 19/06103 |
| 2021/0056535 | A1* | 2/2021 | Xu | G06Q 20/38215 |
| 2021/0103786 | A1* | 4/2021 | Yoshida | H04L 9/0861 |
| 2021/0350649 | A1* | 11/2021 | Jafri | H04W 12/64 |
| 2021/0375008 | A1* | 12/2021 | Hassan | G06N 3/09 |
| 2021/0383088 | A1* | 12/2021 | Nakayama | G06K 7/1491 |
| 2022/0092283 | A1* | 3/2022 | McLeod | G06K 7/1417 |
| 2022/0215192 | A1* | 7/2022 | Xing | G06V 30/224 |
| 2022/0215841 | A1* | 7/2022 | Zhao | G10L 15/30 |
| 2023/0016472 | A1* | 1/2023 | Nguyen | G06V 20/69 |
| 2023/0043690 | A1* | 2/2023 | Spivack | G06K 7/1417 |
| 2023/0386646 | A1* | 11/2023 | Tanwani | G06V 10/806 |
| 2024/0273322 | A1* | 8/2024 | Karmi | H04L 63/1483 |
| 2025/0110163 | A1* | 4/2025 | Dunnihoo | G01R 31/002 |
| 2025/0209291 | A1* | 6/2025 | Garcia Morchon | G06F 11/1004 |

FOREIGN PATENT DOCUMENTS

| | | |
|---|---|---|
| CN | 102243704 A | 11/2011 |
| CN | 104281865 A | 1/2015 |
| CN | 105335771 A | 2/2016 |
| CN | 105407071 A | 3/2016 |
| CN | 106779739 A | 5/2017 |
| CN | 107194450 A | 9/2017 |
| CN | 108256609 A | 7/2018 |
| CN | 105630383 B | 1/2019 |
| CN | 110288069 A | 9/2019 |
| CN | 110633773 A | 12/2019 |
| CN | 112651475 A | 4/2021 |
| EP | 3734510 A1 | 11/2020 |
| JP | 2008047081 A | 2/2008 |
| JP | 2009223498 A | 10/2009 |
| WO | 2015125484 A1 | 8/2015 |
| WO | 2016033033 A1 | 3/2016 |
| WO | 2020143559 A1 | 7/2020 |

OTHER PUBLICATIONS

European Search Report for EP Patent Application No. 21917282.2, Issued on May 2, 2024, 8 pages.
International Search Report and Written Opinion for International Application No. PCT/CN2021/140361, mailed Mar. 4, 2022, 17 Pages.

* cited by examiner

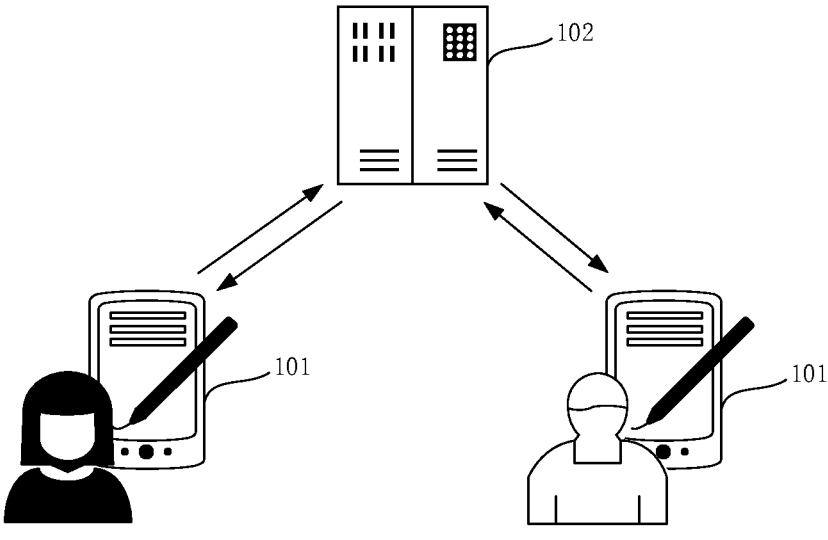

Receiving a 2D code display operation for triggering display of a 2D code image corresponding to a target content, wherein the target content belongs to a first application

S220

In response to the 2D code display operation, displaying the 2D code image including a first primary positioning point and a second primary positioning point that are arranged to overlap, wherein the first primary positioning point is above the second primary positioning point and has a preset color, and wherein the second primary positioning point has a representative color of the first application

Fig. 2

2D code display apparatus 1700

First receiving unit 1710

First display unit 1720

TWO-DIMENSIONAL CODE DISPLAY METHOD, APPARATUS, DEVICE, AND MEDIUM

CROSS-REFERENCE TO RELATED APPLICATIONS

The present disclosure is based on and claims priority to Chinese Patent Application No. 202110014589.0 filed on Jan. 6, 2021, the disclosure of which is incorporated by reference herein in its entirety.

FIELD OF THE INVENTION

The present disclosure relates to the technical field of two-dimensional (2D) code, and particularly to a 2D code display method, apparatus, device, and medium.

BACKGROUND

With the development of Internet technology, 2D codes are being used more and more widely in our lives. For example, people can use 2D codes to share social business cards, short videos, or social platform information, and so on.

SUMMARY

The present disclosure provides a 2D code display method, apparatus, device, and medium. According to one aspect of the disclosure, this disclosure provides a 2D code display method, comprising:

receiving a 2D code display operation for triggering display of a 2D code image corresponding to a target content, wherein the target content belongs to a first application;

in response to the 2D code display operation, displaying the 2D code image including a first primary positioning point and a second primary positioning point that are arranged to overlap, wherein the first primary positioning point is above the second primary positioning point and has a preset color, and wherein the second primary positioning point has a representative color of the first application.

According to one aspect of the disclosure, this disclosure provides a 2D code display apparatus, comprising:

a first receiving unit configured to receive a 2D code display operation for triggering display of a 2D code image corresponding to a target content, wherein the target content belongs to a first application;

a first display unit configured to, in response to the 2D code display operation, display the 2D code image including a first primary positioning point and a second primary positioning point that are arranged to overlap, wherein the first primary positioning point is above the second primary positioning point and has a preset color, and wherein the second primary positioning point has a representative color of the first application.

According to one aspect of the disclosure, the present disclosure provides an electronic device, comprising:

a processor;

a memory for storing executable instructions;

wherein, the processor is configured to read the executable instructions from the memory and perform the executable instructions to implement the 2D code display method described in the first aspect.

According to one aspect of the disclosure, the present disclosure provides a computer readable storage medium storing computer programs thereon, which when executed by a processor, causes the processor to implement the 2D code display method described in the first aspect.

DESCRIPTION OF THE DRAWINGS

The above and other features, advantages, and aspects of the embodiments of the present disclosure will become more apparent from with reference to the following detailed description in conjunction with the drawings. Throughout the drawings, the same or similar reference signs indicate the same or similar elements. It should be understood that the drawings are schematic and the components and elements are not necessarily drawn to scale.

FIG. 1 is a schematic diagram of a 2D code display architecture provided by embodiments of the present disclosure;

FIG. 2 is a schematic flowchart of a 2D code display method provided by embodiments of the present disclosure;

DETAILED DESCRIPTION

Figure 3:
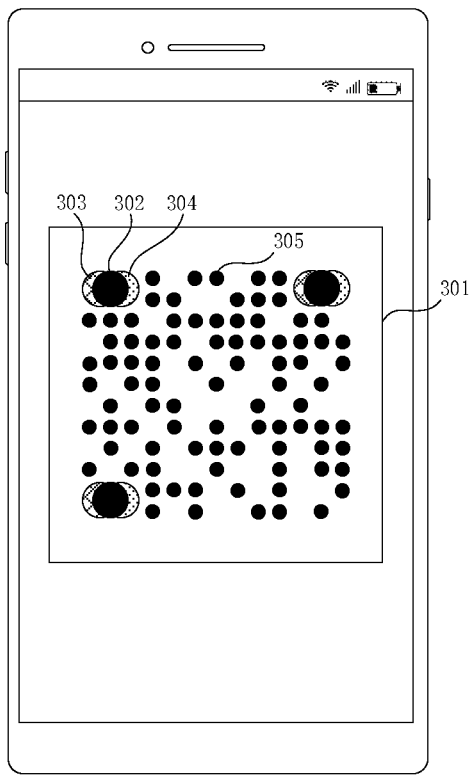
FIG. 3 is a schematic diagram of a 2D code image provided by embodiments of the present disclosure.

Embodiments of the present disclosure will be described below in more detail with reference to the accompanying drawings. Although some embodiments of the present disclosure are shown in the drawings, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the method implementations of the present disclosure may be executed in a different order, and/or executed in parallel. In addition, the method implementations may include additional steps and/or some of the illustrated steps may be omitted. The scope of this disclosure is not limited in this regard.

The term "including" and its variants as used herein is an open-ended mode expression, that is, "including but not limited to". The term "based on" means "based at least in part on". The term "one embodiment" means "at least one embodiment"; the term "another embodiment" means "at least one additional embodiment"; the term "some embodiments" means "at least some embodiments". Related definitions of other terms will be given in the following description.

It should be noted that the concepts of "first" and "second" mentioned in the present disclosure are only used to distinguish different devices, modules or units, and are not used to limit the order of functions performed by these devices, modules or units, or interdependence therebetween.

It should be noted that the modifications of "a" and "a plurality of" mentioned in the present disclosure are illustrative and not restrictive, and those skilled in the art should understand that unless clearly indicated otherwise in the context, they should be understood as "one or more".

The names of messages or information exchanged between multiple devices in the implementations of the present disclosure are only used for illustrative purposes, and are not used to limit the scope of the messages or information.

As discussed above, 2D codes are being used more and more widely in our lives. However, the style of current 2D codes is relatively monotonous, and it is impossible for a 2D code to reflect a unique style of an application by itself, resulting in low recognizability of 2D codes.

The 2D code display method provided by the present disclosure can be applied to an architecture shown in FIG. 1, which will be described in detail with reference to FIG. 1.

FIG. 1 is a schematic diagram of a 2D code display architecture provided by embodiments of the present disclosure.

As shown in FIG. 1, the 2D code display architecture 100 can include at least one electronic device 101 of the client end and at least one server 102 of the server end. The electronic device 101 may establish a connection with the server 102 and perform information interaction through a network protocol, such as Hyper Text Transfer Protocol over Secure Socket Layer (HTTPS). The electronic device 101 may include a mobile phone, a tablet computer, a desktop computer, a notebook computer, a vehicle-mounted terminal, a wearable electronic device, an all-in-one computer, a smart home device, and other device with a communication function, or a device simulated on a simulator or a virtual machine. The server 102 may be a device with storage and computing functions, such as a cloud server or a server cluster, or the like.

Based on the above architecture, a user can display a 2D code image corresponding to a target content that belongs to a specified application through the electronic device 101.

When the user wants to display a 2D code image corresponding to a target content that belongs to a specified application through the electronic device 101, the user can input a 2D code display operation to the electronic device 101, so that the electronic device 101 can receive the 2D code display operation, and display the 2D code image corresponding to the target content in response to the 2D code display operation.

The 2D code image displayed by the electronic device 101 may include a first primary positioning point and a second primary positioning point that are arranged to overlap. The first primary positioning point may be above the second primary positioning point and have a preset color. The second primary positioning point may have a representative color of the specified application, so that the 2D code has the representative color of the specified application, thereby capable of reflecting a style unique to the specified application through the representative color, and improving the recognizability of the 2D code.

In some embodiments, the 2D code image may be generated by the server 102 of the specified application, or it can be generated by the electronic device 101, for example, generated by the specified application, which is not limited herein.

In some examples, when the 2D code display operation is an operation for a 2D code image that is not stored locally in the electronic device 101, the electronic device 101 may, after receiving the 2D code display operation input by the user in the specified application, send a 2D code acquisition request carrying the target content to the server 102 of the specified application, so that the server 102 can feed back the 2D code image corresponding to the target content to the electronic device 101 in response to the 2D code acquisition request.

In the case that the 2D code image is an image generated in real time based on the target content, the server 102 may, after receiving the 2D code acquisition request carrying the target content sent by the electronic device 101, generate a 2D code image including the first and second primary positioning points that are arranged to overlap described above, and send the generated 2D code image to the electronic device 101. In this case, the 2D code image generated in real time by the server 102 based on the same target content may be different each time.

It should be noted that when the 2D code image is an image generated in real time based on the target content, the electronic device 101 may also generate a 2D code image including the first and second primary positioning points that are arranged to overlap described above after receiving the 2D code display operation input by the user in the specified application, which will not be described in detail herein.

In the case that the 2D code image is an image that is generated in advance based on the target content, the server 102 may, after receiving the 2D code acquisition request carrying the target content sent by the electronic device 101, search for a 2D code image corresponding to the target content from images stored thereon in response to the 2D code acquisition request, and send the 2D code image found by it to the electronic device 101. The 2D code image can be generated by the server 102 in advance based on the first and second primary positioning points that are arranged to overlap described above. In this case, the 2D code image that the server 102 finds based on the same target content is the same each time.

It should be noted that in the case that the 2D code image is an image generated in advance based on the target content, the electronic device 101 may, after receiving the 2D code display operation input by the user in the specified application, search for a 2D code image corresponding to the target content from images stored thereon, which will not be described in detail herein.

Further, after receiving the 2D code image sent by the server 102, the electronic device 101 may display the 2D code image.

Therefore, in these examples, the user can display, through the electronic device 101, a 2D code image that is not locally stored in the electronic device 101.

In the scenario where a user shares information using a 2D code, the target content can be the information to be shared in the specified application or an acquisition address of a web page used to display the information to be shared in the specified application. The 2D code image can be a sharing 2D code image generated based on the information to be shared or the acquisition address. In this event, when the user displays or sends the sharing 2D code image to a sharing partner, since the sharing 2D code image can reflect a style unique to the specified application through the representative color, not only the aesthetic appearance of the 2D code can be improved, but also the sharing partner can be quickly aware of the application to which the 2D code belongs based on the representative color, thereby improving the recognizability of the 2D code.

It should be noted that, in addition to the scenario where a user shares information using a 2D code, the architecture shown in FIG. 1 can also be applied to other scenarios where a 2D code needs to be displayed or used, which is not limited herein.

In other examples, when the 2D code display operation is an operation directed to a 2D code image stored locally by the electronic device 101, the electronic device 101 may directly display the locally stored 2D code image.

In these examples, the electronic device 101 may receive a 2D code image sent by the server 102 in advance, and store the received 2D code image locally.

Therefore, in these examples, the user can display the locally stored 2D code image through the electronic device 101.

According to the above architecture, a 2D code display method provided by embodiments of the present disclosure will be described below with reference with FIGS. 2 to 16. In the embodiments of the present disclosure, the 2D code display method may be executed by an electronic device. In some embodiments, the electronic device may be the electronic device 101 in the client shown in FIG. 1. The electronic device can include a mobile phone, a tablet computer, a desktop computer, a notebook computer, a vehicle-mounted terminal, a wearable electronic device, an all-in-one computer, a smart home device, and other device with a communication function, or a device simulated on a simulator or a virtual machine.

FIG. 2 is a schematic flowchart of a 2D code display method provided by embodiments of the present disclosure.

As shown in FIG. 2, the 2D code display method may include the following steps:

S210: receiving a 2D code display operation for triggering display of a 2D code image corresponding to a target content, wherein the target content belongs to a first application.

In the embodiment of the present disclosure, when the user wants to display a 2D code image corresponding to a target content that belongs to a first application through the electronic device, the user can input a 2D code display operation to the electronic device for triggering the display of the 2D code image, so that the electronic device can receive the 2D code display operation.

The first application may be any application, and the target content may be any content belonging to the first application, which is not limited herein.

For example, the first application may include an application with an information sharing function, and the target content may include any information to be shared in the first application or an acquisition address of a web page showing the information to be shared. The 2D code image may include the information to be shared or may be a sharing 2D code image corresponding to the acquisition address.

In some embodiments, the information to be shared may include at least one of a user's personal social homepage information, a user's social business card, social platform information, an image, a set of images, a video, a set of videos, a special effect, music, an image editing template, a video editing template, or the like.

It should be noted that the information to be shared may also be information that other users want to display or share through the 2D code, which is not limited herein.

S220: in response to the 2D code display operation, displaying the 2D code image including a first primary positioning point and a second primary positioning point that are arranged to overlap, wherein the first primary positioning point is above the second primary positioning point and has a preset color, and wherein the second primary positioning point has a representative color of the first application.

In the embodiment of the present disclosure, after receiving the 2D code display operation input by the user, the electronic device may display a 2D code image corresponding to a target content that belongs to a first application in response to the 2D code display operation.

In some embodiments, the electronic device may display the 2D code image in a full screen, or may display the 2D code image as a non-full-screen image at any position, which is not limited herein.

In some embodiments of the present disclosure, the 2D code image may be a rectangular image including two or three sets of first and second primary positioning points that are arranged to overlap, and each set of first and second primary positioning points that are arranged to overlap can be disposed at a preset vertex of the 2D code image.

In some embodiments, the 2D code image may include two sets of first and second primary positioning points that are arranged to overlap, which can be located at two adjacent preset vertices of the 2D code image, respectively.

In some other embodiments, the 2D code image may include three sets of first and second primary positioning points that are arranged to overlap, which are located at three preset vertices of the 2D code image, respectively, such that the centers of these three sets of first and second primary positioning points that are arranged to overlap can form an isosceles right-angled triangle.

In some embodiments of the present disclosure, the number of the first primary positioning points in each set may be one or more than one, which is not limited herein.

In some embodiments, in the case that the number of the first primary positioning points in each set is more than one, the plurality of first primary positioning points may also be arranged to overlap each other.

In some embodiments of the present disclosure, the number of the second primary positioning points in each set may be one or more than one, which is not limited herein.

In some embodiments, in the case that the number of the second primary positioning points in each set is one, if the number of the first primary positioning points in each set is one, the second primary positioning point can be overlapped with any portion of the first primary positioning point; if the number of the first primary positioning points in each set is more than one, the second primary positioning point can be overlapped with any portion of at least one of the first primary positioning points.

In some embodiments, in the case that the number of the second primary positioning points in each set is more than one, if the number of the first primary positioning points in each set is one, each of the second primary positioning points can be overlapped with different portions of the first primary positioning point, respectively. The overlapping portions of the second primary positioning points and the first primary positioning point may partially overlap each other.

Taking the case where the number of the first primary positioning points in each set of first and second primary positioning points is one and the number of the second primary positioning points in each set of first and second primary positioning points is two as an example, upon arranging the two second primary positioning points to overlap with the first primary positioning point, the centers of the two second primary positioning points can be collinear with the center of the first primary positioning point, and the centers of the two second primary positioning points can be located at opposite sides of the center of the first primary positioning point, respectively.

In some embodiments, in the case that the number of the second primary positioning points in each set of first and second primary positioning points is more than one, if the number of the first primary positioning points in each set is more than one, each of the second primary positioning points can be overlapped with different portions of at least one of the first primary positioning points. The overlapping portions of the second primary positioning points and the first primary positioning points may partially overlap each other.

Taking the case where the number of the first primary positioning points in each set of first and second primary positioning points is two and the number of the second primary positioning points in each set of first and second primary positioning points is two as an example, the two first primary positioning points may be arranged to overlap with each other, and upon arranging the two second primary positioning points to overlap with the two first primary positioning points, the centers of the two second primary positioning points can be collinear with the centers of the two first primary positioning points, and the centers of the two second primary positioning points can be located at opposite sides of the centers of the two first primary positioning points, respectively.

In some embodiments of the present disclosure, the first primary positioning point may have a preset color, that is, the first primary positioning point may be displayed in a preset color.

In some embodiments, the preset color may include at least one of black and other colors that turns to black after being binarized, which is not limited herein.

In some embodiments of the present disclosure, the second primary positioning point may have a representative color of the first application, that is, the second primary positioning point may be displayed in a representative color of the first application.

The representative color may include a color included in a representative icon of the first application.

In some embodiments, the representative icon may include a LOGO (Logotype) of the first application.

In some embodiments, the representative color of the first application may include at least one of at least one first-type color whose binarized color is the same as the preset color and at least one second-type color whose binarized color is different from the preset color, which is not limited herein.

In some embodiments, the number of the first-type colors may be one or more than one, which is not limited herein.

In some embodiments, the number of the second-type colors may be one or more than one, which is not limited herein.

In some embodiments of the present disclosure, the first primary positioning point may be located above the second primary positioning point, so that the overlapping portion of the first and second primary positioning points may have a preset color, that is, the overlapping portion of the first and second primary positioning points may be displayed in a preset color.

The first and second primary positioning points will be described in detail below with a specific example.

FIG. 3 is a schematic diagram of a 2D code image provided by embodiments of the present disclosure.

As shown in FIG. 3, the electronic device may display a 2D code image 301. The 2D code image 301 may include three sets of first and second primary positioning points that are arranged to overlap, which can be located at the upper left vertex, the lower left vertex, and the upper right vertex of the 2D code image 301, respectively.

The first primary positioning point may include a first color primary positioning point 302 (the large black point in FIG. 3), and the second primary positioning points may include a second color primary positioning point 303 (the large grid-filled point in FIG. 3) and a third color primary positioning point 304 (the large dot-filled point in FIG. 3). The first color primary positioning point 302 is overlapped with the second color primary positioning point 303 and the third color primary positioning point 304, respectively, and the first color primary positioning point 302 is located above the second color primary positioning point 303 and the third color primary positioning point 304.

The centers of the first color primary positioning point 302, the second color primary positioning point 303, and the third color primary positioning point 304 are collinear, with the center of the second color primary positioning point 303 located on the left side of the first color primary positioning point 302, and the center of the third color primary positioning point 304 located on the right side of the first color primary positioning point 302.

In some embodiments, taking the case in which the preset color includes black and the representative colors include red and blue as an example for illustration, the binarized color of red may be black, and the binarized color of blue may be white. The first color primary positioning point 302 may be a black primary positioning point, the second color primary positioning point 303 may be a red primary positioning point, and the third color primary positioning point 304 may be a blue primary positioning point.

In this embodiment of the present disclosure, a 2D code image corresponding to a target content in a first application can be displayed based on a 2D code display operation, wherein the 2D code image may include a first primary positioning point and a second primary positioning point that are arranged to overlap, wherein the first primary positioning point is above the second primary positioning point and has a preset color, and wherein the second primary positioning point has a representative color of the first application, so that the 2D code has a representative color of the first application, thereby capable of reflecting a style unique to the first application through the representative color, and improving the recognizability of the 2D code.

Returning to FIG. 2, the 2D code display operation in S210 will be further described below.

In some embodiments of the present disclosure, the 2D code display operation may be used to trigger the display of a 2D code image that is not stored in a local target storage space of the electronic device.

The 2D code display operation may be an operation such as clicking, long pressing, double-clicking, voice control, expression control, or the like on a first control within the first application.

The first control can be used to trigger the display of a 2D code image that is not stored in a local target storage space of the electronic device.

For example, in the case where the 2D code image is a sharing 2D code image, the first control may be a "Share" button. In this way, the user can enable the electronic device to display a 2D code image that is not stored in a local target storage space of the electronic device through the 2D code display operation.

In some other embodiments of the present disclosure, the 2D code display operation may be used to trigger the display of a 2D code image stored in a local target storage space of the electronic device. The 2D code display operation may be an operation such as clicking, long pressing, double-clicking, voice control, expression control, or the like on a second control local to the electronic device. In some examples, the second control may be used to trigger the opening of a target storage space storing the 2D code image, so that the electronic device can display the 2D code image. For example, the target storage space may be an album, and the second control may be an album icon displayed on the desktop of the electronic device. In other examples, the second control can be used to trigger the display of the 2D code image stored in the target storage space. For example, the target storage space may be an album, and the second control may be a preview image of the 2D code image displayed in the album.

The above is a further explanation of the 2D code display operation in S210, and a method for obtaining a 2D code image for display by the electronic device will be described below.

In some embodiments of the present disclosure, in a case where the 2D code display operation is used to trigger the display of a 2D code image that is not stored in a local target storage space of the electronic device, and the 2D code image is generated by a server of the first application, before S220, the 2D code display method may further comprise:

sending a 2D code acquisition request carrying a target content to the server of the first application, wherein the 2D code acquisition request is used to enable the server to feed back a 2D code image corresponding to the target content; receiving the 2D code image fed back by the server.

The server may be the server 102 in the embodiment shown in FIG. 1. The server may be a device with storage and computing functions, such as a cloud server or a server cluster.

Thus, the electronic device can, after receiving the 2D code display operation, send a 2D code acquisition request carrying a target content to a server of the first application responsive to the 2D code display operation, so that the server, after receiving the 2D code acquisition request carrying the target content sent by the electronic device, can feed back a 2D code image corresponding to the target content to the electronic device responsive to the 2D code acquisition request. The electronic device can receive the 2D code image fed back by the server and display the 2D code image.

In some embodiments, when the 2D code image is an image generated in real time based on the target content, the 2D code acquisition request may be used to enable the server to generate and feed back a 2D code image corresponding to the target content.

Thus, in response to the 2D code acquisition request, the server can generate a 2D code image corresponding to the target content based on the first and second primary positioning points that are arranged to overlap described above, and send the generated 2D code image to the electronic device.

In some embodiments, when the 2D code image is an image generated in advance based on the target content, the 2D code acquisition request may be used to enable the server to search for and feed back a 2D code image corresponding to the target content.

Thus, in response to the 2D code acquisition request, the server can search for a 2D code image corresponding to the target content from images stored thereon, and send the 2D code image found by it to the electronic device.

The 2D code image can be generated by the server in advance based on the first and second primary positioning points that are arranged to overlap described above.

In some other embodiments of the present disclosure, in a case where the 2D code display operation is used to trigger the display of a 2D code image that is not stored in a local target storage space of the electronic device, and the 2D code image is generated by the electronic device via the first application, before S220, the 2D code display method may further comprise:

generating a 2D code image corresponding to the target content. The method of generating a 2D code image by the electronic device is similar to the method of generating a 2D code image by the server, which will not be described herein.

In another implementation of the present disclosure, in order to improve the accuracy of positioning of the 2D code image, the 2D code image may further include auxiliary positioning points, which can be evenly arranged around the first and second primary positioning points that are arranged to overlap.

In some embodiments, the 2D code image may include at least one set of auxiliary positioning points, and the number of sets of auxiliary positioning points may be the same as the number of sets of first and second primary positioning points that are arranged to overlap. Each set of auxiliary positioning points are evenly arranged around a set of first and second primary positioning points that are arranged to overlap. In some embodiments, the number of auxiliary positioning points in each set can be a multiple of four. For example, the number of auxiliary positioning points can be 4, 8, 12, etc., which is not limited herein. Thereby, upon evenly arranging the auxiliary positioning points around the first and second primary positioning points that are arranged to overlap, the centers of each set of auxiliary positioning points may form a rectangle.

In some embodiments of the present disclosure, the auxiliary positioning points may have the preset color described above.

These auxiliary positioning points in these embodiments of the present disclosure will be described in detail below with a specific example.

Figure 4:
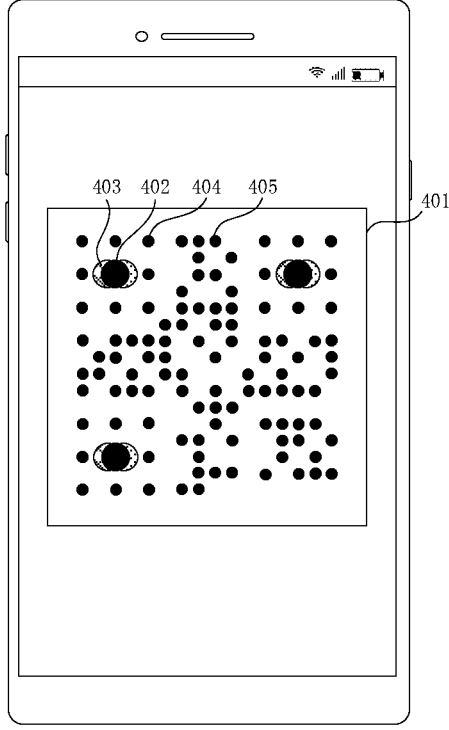
FIG. 4 is a schematic diagram of another 2D code image provided by embodiments of the present disclosure.

FIG. 4 is a schematic diagram of another 2D code image provided by embodiments of the present disclosure.

As shown in FIG. 4, the electronic device may display a 2D code image 401 including three sets of first primary positioning points 402 and second primary positioning points 403 that are arranged to overlap, and three sets of auxiliary positioning points 404.

The first primary positioning point 402 and the second primary positioning point 403 are similar to the first primary positioning point and the second primary positioning point in the embodiment shown in FIG. 3, and will not be described herein.

The number of each set of auxiliary positioning points 404 may be eight, and a set of auxiliary positioning points 404 may be evenly arranged around a set of first primary positioning point 402 and second primary positioning point 403.

In some embodiments, in the case where the preset color includes black, the auxiliary positioning points 404 may be black.

In some other embodiments of the present disclosure, when the representative color includes a first-type color, and the binarized color of the first-type color is the same as the preset color, the auxiliary positioning points may include first auxiliary positioning points and second auxiliary positioning points. The first auxiliary positioning points may have a preset color, and the second auxiliary positioning points may have a first-type color.

Since the binarized color of the first-type color is the same as the preset color, the binarized color of the first-type color is still black. Therefore, even if the second auxiliary positioning points have the first-type color, their positioning function will not be affected.

In some embodiments, the proportion of the second auxiliary positioning points in the auxiliary positioning points may be a first preset ratio. The first preset ratio may be any value in the range of (0,1), which is not limited herein. For example, taking the case in which the number of auxiliary positioning points in each set is 8 as an example, the first preset ratio may be ⅛ or ¼. In the embodiments described above, in the process of generating a 2D code image, the server or the electronic device may first generate auxiliary positioning points corresponding to each set of first and second primary positioning points. At this time, all the auxiliary positioning points are in a preset color such as black. Then, a first preset ratio of auxiliary positioning points can be randomly selected in each set, and the selected auxiliary positioning points can be converted from the preset color to the first-type color (such as red), so that each set of auxiliary positioning points includes first and second auxiliary positioning points.

The auxiliary positioning points in the embodiments of the present disclosure will be described in detail below with a specific example.

Figure 5:
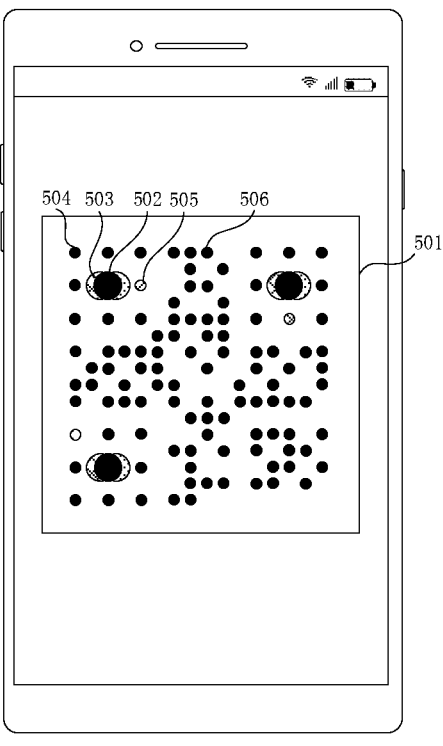
FIG. 5 is a schematic diagram of still another 2D code image provided by embodiments of the present disclosure.

FIG. 5 is a schematic diagram of still another 2D code image provided by embodiments of the present disclosure.

As shown in FIG. 5, the electronic device may display a 2D code image 501, which may include three sets of first primary positioning points 502 and second primary positioning points 503 that are arranged to overlap, and three sets of corresponding auxiliary positioning points.

The first primary positioning points 502 and the second primary positioning points 503 are similar to the first primary positioning points and the second primary positioning points in the embodiment shown in FIG. 3, and will not be described herein.

An illustrative description will be given with an example, in which the number of each set of auxiliary positioning points is 8, a set of auxiliary positioning points can be evenly arranged around a set of corresponding first primary positioning points 502 and second primary positioning points 503, and the first preset ratio is ⅛. Each set of auxiliary positioning points may include 7 first auxiliary positioning points 504 and 1 second auxiliary positioning point 505.

In some embodiments, in the case where the preset color includes black, and the first-type color includes red, the first auxiliary positioning points 504 may be black, and the second auxiliary positioning points 505 may be red.

Therefore, in the embodiment of the present disclosure, without affecting the positioning effect of the 2D code, the color of the second auxiliary positioning point(s) among the auxiliary positioning points can be further used to improve the recognizability of the 2D code.

In yet another implementation of the present disclosure, the 2D code image may further include a data point matrix, wherein the data point matrix may be generated according to the target content, and may be used to enable a second application to obtain the target content.

Further, the second application may include at least one of the first application and an application other than the first application, which is not limited herein. Thus, the 2D code image can be a universal 2D code image.

In some embodiments, in the case where the second application is the first application itself, the data point matrix can be used to enable the first application to directly obtain the target content after scanning or recognizing the 2D code image, and display information to be shared corresponding to the target content.

In some embodiments, in the case where the second application is an application other than the first application, the data point matrix can be used to enable the second application to obtain the target content of the first application in the second application after scanning or recognizing the 2D code image, and display information to be shared corresponding to the target content. For example, after scanning or recognizing the 2D code image, the second application can convert the data point matrix into a target content, and display the information to be shared corresponding to the target content through a built-in browser page, an applet page, or a fifth-generation hypertext markup language (HTML5, H5) page of the second application.

In some embodiments, in the case where the second application is an application other than the first application, the data point matrix can be further used to enable the second application to jump to the first application to obtain the target content after scanning or recognizing the 2D code image, and display information to be shared corresponding to the target content. For example, after scanning or recognizing the 2D code image, the second application can convert the data point matrix into a target content, and determine a first application the target content belongs to. Then, the second application can jump to the first application, so that the first application can display the information to be shared corresponding to the target content.

In some embodiments of the present disclosure, the data points in the data point matrix may have the preset color described above, as shown in FIGS. 3 to 5.

In FIG. 3, the 2D code image 301 may include a data point matrix including the data point 305.

In the case where the preset color includes black, the data point 305 may be black.

In FIG. 4, the 2D code image 401 may include a data point matrix including the data point 405.

In the case where the preset color includes black, the data point 405 may be black.

In FIG. 5, the 2D code image 501 may include a data point matrix including the data point 506.

In the case where the preset color includes black, the data point 506 may be black.

In some other embodiments of the present disclosure, the data point matrix may include a first data point having the preset color described above and a second data point having the representative color described above.

In some embodiments, in the case where the representative color includes a first-type color whose binarized color is the same as the preset color, the second data points may include first-type second data points that may have a first-type color, wherein the first data points and the first-type second data points can be generated according to the target content.

Since the binarized color of the first-type color is the same as the preset color, the binarized color of the first-type color is still black. Therefore, even if the first-type second data points have the first-type color, their data recognizability function will not be affected.

In some embodiments, the proportion of the first-type second data points in the total number of the first data points and the first-type second data points may be a second preset ratio. The second preset ratio may be any value in the range of (0,1), which is not limited herein. For example, the second preset ratio may be 1%, 3%, 5%, or 10%, which is not limited herein.

In some embodiments, in the case where the representative color includes a second-type color whose binarized color is different from the preset color, the second data points may include second-type second data points that may have a second-type color. Since the binarized color of the second-type color is different from the preset color, the binarized color of the second-type color is white. Therefore, even if the second-type second data points have the second-type color, the content recognized based on the data point matrix will not be affected.

In some embodiments, the proportion of the second-type second data points in blank data point positions other than the first data points and the first-type second data points in the 2D code image may be a third preset ratio. The third preset ratio may be any value in the range of (0,1), which is not limited herein. For example, the third preset ratio may be 1%, 3%, 5%, or 10%, which is not limited herein.

In these embodiments, the server can first generate an initial data point matrix according to the target content. In the initial data point matrix, each data point is in a preset color such as black. Then, the server can randomly select the second preset ratio of data points from the initial data points, and convert the selected data points from the preset color to a first-type color (such as red), so that the data point matrix includes first data points and first-type second data points.

Next, the server can randomly select the third preset ratio of blank data point positions from the blank data point positions in the data point matrix, and generate second-type second data points with a second-type color (such as blue) on the selected blank data point positions, so as to obtain a final data point matrix composed of the first data points, the first-type second data points and the second-type second data points.

The data point matrix in the embodiments of the present disclosure will be described in detail below with a specific example.

Figure 6:
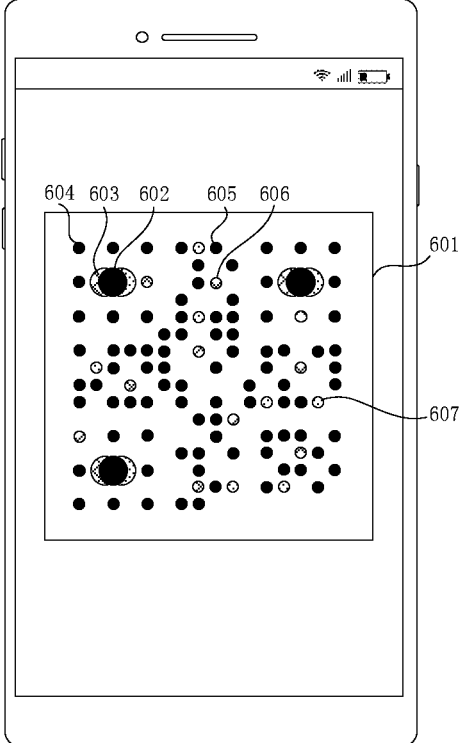
FIG. 6 is a schematic diagram of yet another 2D code image provided by embodiments of the present disclosure.

FIG. 6 is a schematic diagram of yet another 2D code image provided by embodiments of the present disclosure.

As shown in FIG. 6, the electronic device may display a 2D code image 601 that may include three sets of first primary positioning points 602 and second primary positioning points 603 that are arranged to overlap, three sets of auxiliary positioning points 604, and a data point matrix.

The three sets of first primary positioning points 602 and second primary positioning points 603 that are arranged to overlap and the corresponding three sets of auxiliary positioning points 604 are similar to the first primary positioning points 502, the second primary positioning points 503 and auxiliary positioning points in the embodiment shown in FIG. 5, and will not be described herein.

The data point matrix may include first data points 605 (small black dots in FIG. 6), first-type second data points 606 (grid-filled small dots in FIG. 6), and second-type second data points 607 (dot-filled small dots in FIG. 6).

In some embodiments, in the case where the preset color includes black and the representative colors include red and blue, the binarized color of red may be black, and the binarized color of blue may be white. The first data points 605 may be black, the first-type second data points 606 may be red, and the second-type second data points 607 may be blue.

Therefore, in the embodiment of the present disclosure, without affecting the reliability of information reading of the 2D code, the colors of the second data points in the data point matrix can be further used to improve the recognizability of the 2D code.

In still another embodiment of the present disclosure, in order to further improve the recognizability of the 2D code, the 2D code image may further include an image frame that may be generated according to the representative color.

In some embodiments, the image frame may be a closed frame composed of sub-frames in the representative color. The closed frame can be enclosed in a closed shape.

In the case where the representative colors include a first-type color and a second-type color, the image frame may be a closed frame composed of a first sub-frame with the first-type color and a second sub-frame with the second-type color.

The image frame in the embodiments of the present disclosure will be described in detail below with a specific example.

Figure 7:
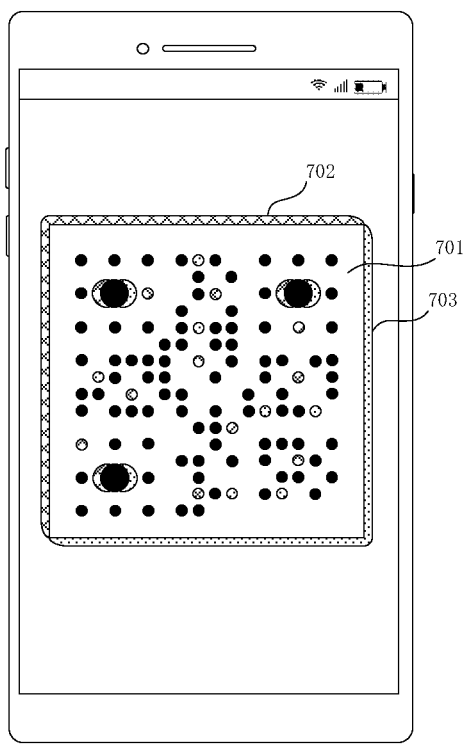
FIG. 7 is a schematic diagram of a 2D code image frame provided by embodiments of the present disclosure.

FIG. 7 is a schematic diagram of a 2D code image frame provided by embodiments of the present disclosure.

As shown in FIG. 7, the electronic device may display a 2D code image 701. The periphery of the 2D code image 701 is provided with an image frame, which can be composed of a L-shaped first sub-frame 702 and a L-shaped second sub-frame 703. The first sub-frame 702 and the second sub-frame 703 can be enclosed in a rectangle.

In some embodiments, in the case where the representative colors include red and blue, the binarized color of red may be black, and the binarized color of blue may be white. The first sub-frame 702 may be red, and the second sub-frame 703 may be blue.

It should be noted that the 2D code image 701 is similar to the 2D code image shown in FIG. 6, and will not be described herein.

In some embodiments, the image frame may also be an open frame composed of sub-frames with representative colors. Every two adjacent sub-frames are not connected to each other. If every two adjacent sub-frames are connected, a closed shape can be enclosed.

In the case where the representative colors include a first-type color and a second-type color, each sub-frame of the image frame may include a first sub-frame portion with a first-type color and a second sub-frame portion with a second-type color, respectively.

The image frame in the embodiments of the present disclosure will be described in detail below with a specific example.

Figure 8:
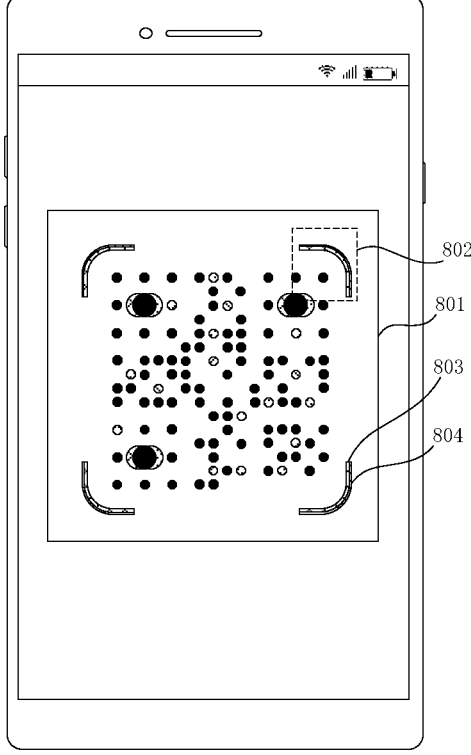
FIG. 8 is a schematic diagram of another 2D code image frame provided by embodiments of the present disclosure.

FIG. 8 is a schematic diagram of another 2D code image frame provided by embodiments of the present disclosure.

As shown in FIG. 8, the electronic device may display a 2D code image 801 provided with an image frame therein. The image frame is composed of 4 L-shaped sub-frames 802. The sub-frames 802 can be located at 4 vertices of the 2D code image 801, and each sub-frame 802 can include a first sub-frame portion 803 and a second sub-frame portion 804. In addition, in order to make the 2D code image more aesthetically pleasing, each L-shaped sub-frame 802 may have a rounded corner, that is, a certain arc is present at the corner of the L-shaped sub-frame 802.

In some embodiments, in the case where the representative colors include red and blue, the binarized color of red may be black, and the binarized color of blue may be white. The first sub-frame portion 803 may be red, and the second sub-frame portion 804 may be blue.

It should be noted that the 2D code image 601 is similar to the 2D code image shown in FIG. 6, and will not be described herein.

In some other embodiments of the present disclosure, the 2D code image may also include content information of the target content, wherein the content information may include at least one of a category icon of the target content and a content name of the target content, or the like.

In some embodiments, in the case where the image frame is a closed frame composed of sub-frames with representative colors, the content information may be located within the image frame.

Figure 9:
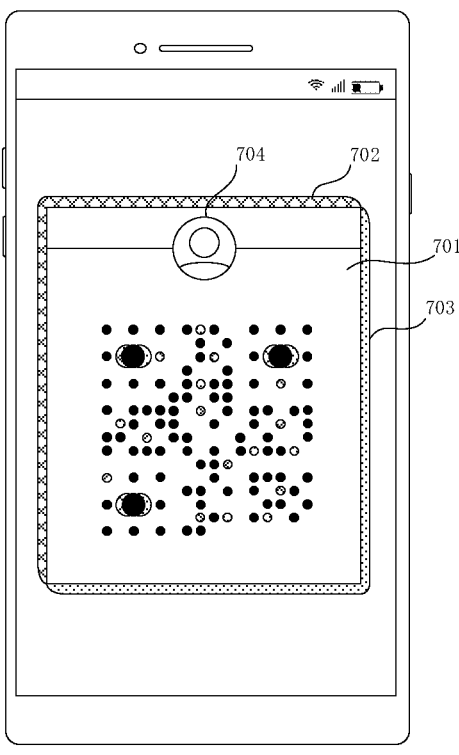
FIG. 9 is a schematic diagram of still another 2D code image frame provided by embodiments of the present disclosure.

FIG. 9 is a schematic diagram of still another 2D code image frame provided by embodiments of the present disclosure.

As shown in FIG. 9, the electronic device may display a 2D code image 701. The periphery of the 2D code image 701 is provided with an image frame, which may be composed of a L-shaped first sub-frame 702 and a L-shaped second sub-frame 703. The 2D code image 701 may further include a category icon 704 of the target content. The category icon 704 may be used to show the category of the target content, and can be located within a rectangle enclosed by the first sub-frame 702 and the second sub-frame 703.

In some embodiments, in the case where the image frame is an open frame composed of sub-frames with representative colors, the content information may be located outside the image frame.

Figure 10:
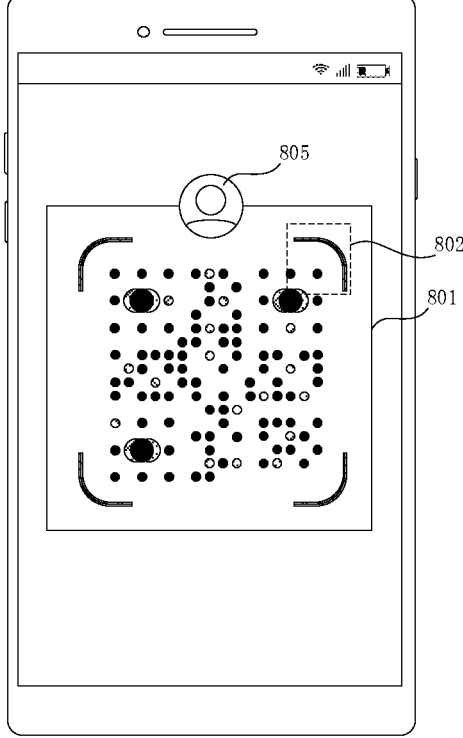
FIG. 10 is a schematic diagram of yet another 2D code image frame provided by embodiments of the present disclosure.

FIG. 10 is a schematic diagram of yet another 2D code image frame provided by embodiments of the present disclosure.

As shown in FIG. 10, the electronic device may display a 2D code image 801. The 2D code image 801 is provided with an image frame therein. On the top edge of the 2D code image 801, a category icon 805 of a target content may be provided. The category icon 805 may be used to show the category of the target content, and may be located above the image frame.

The image frame may be composed of 4 L-shaped sub-frames 802. The 4 sub-frames 802 may be located at 4 vertices of the 2D code image 801. Each sub-frame 802 can include a first sub-frame portion and a second sub-frame portion.

In still other embodiments of the present disclosure, the image frame may also be generated according to the representative color and the preset color.

In some embodiments, the image frame may be a closed frame composed of sub-frames in the representative color and the preset color, respectively. The closed frame can be enclosed in a closed shape.

In some embodiments, the image frame may also be an open frame composed of sub-frames in the representative color and the preset color, respectively.

Figure 11:
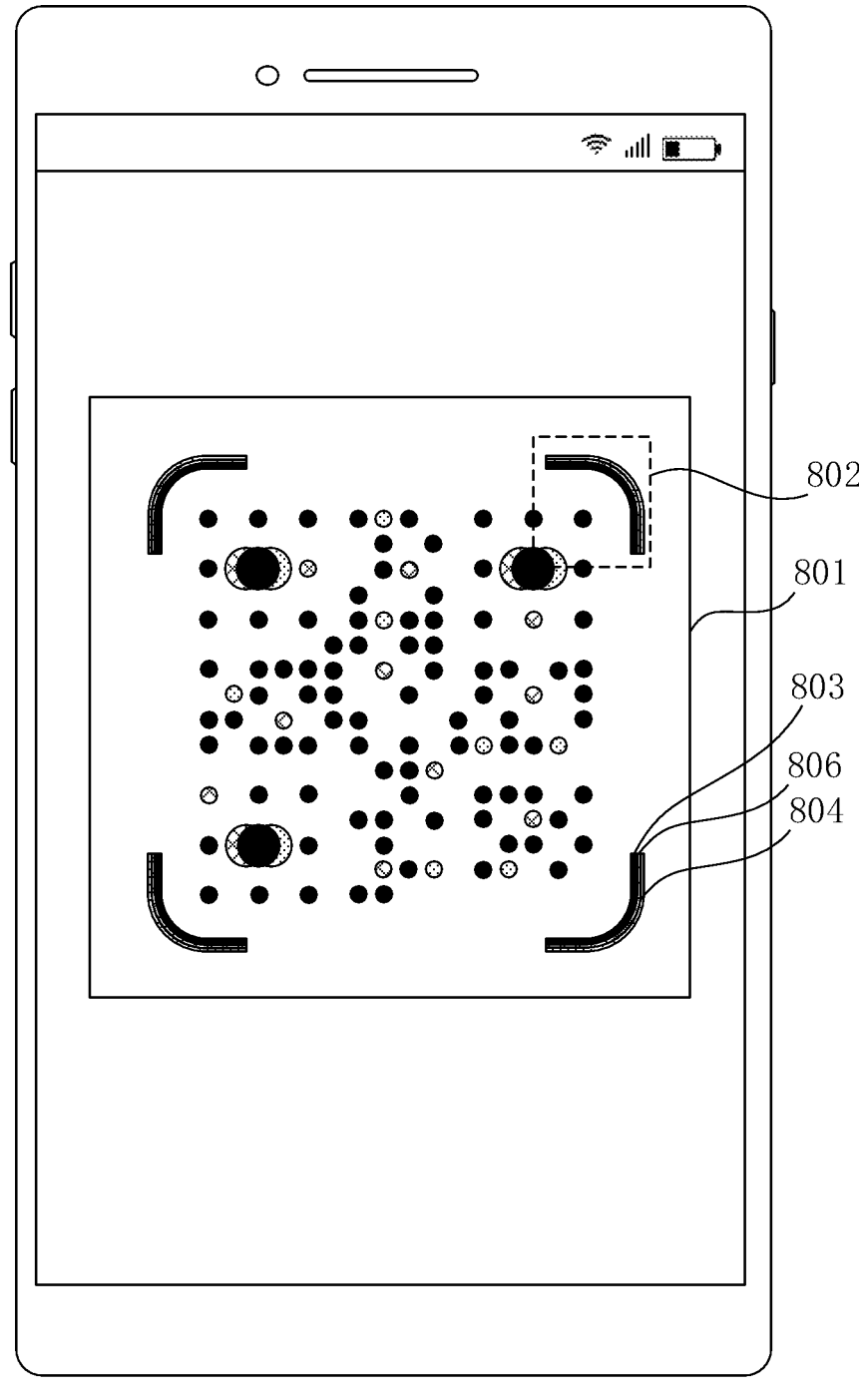
FIG. 11 is a schematic diagram of yet another 2D code image frame provided by embodiments of the present disclosure.

FIG. 11 is a schematic diagram of yet another 2D code image frame provided by embodiments of the present disclosure.

As shown in FIG. 11, the electronic device may display a 2D code image 801 provided with an image frame therein. The image frame may be composed of 4 L-shaped sub-frames 802. The 4 sub-frames 802 may be located at 4 vertices of the 2D code image 801. Each sub-frame 802 can include a first sub-frame portion 803, a second sub-frame portion 804, and a third sub-frame portion 806.

In some embodiments, in the case where the preset color includes black and the representative colors include red and blue, the binarized color of red may be black, and the binarized color of blue may be white. The first sub-frame portion 803 may be red, the second sub-frame portion 804 may be blue, and the third sub-frame portion 806 may be black.

Therefore, in the embodiment of the present disclosure, the colors of the image frame of the 2D code image can be further used to improve the recognizability of the 2D code.

In another implementation of the present disclosure, returning to FIG. 2, after S210, the 2D code display method may further comprise:

displaying a target control responsive to the 2D code display operation.

In some embodiments, the target control may include at least one of a 2D code storage control, a 2D code scanning control, and a 2D code sharing control.

In some embodiments, the target control may further include a control for triggering other functions, which is not limited herein.

In some embodiments, the target control can be displayed in any position outside the 2D code image, which is not limited herein. For example, the target control can be displayed on any position of the 2D code image, such as the top, bottom, top right, top left, bottom left, and bottom right of the 2D code image, or the like.

An interface displaying a 2D code image and a target control will be described in detail below with a specific example.

Figure 12:
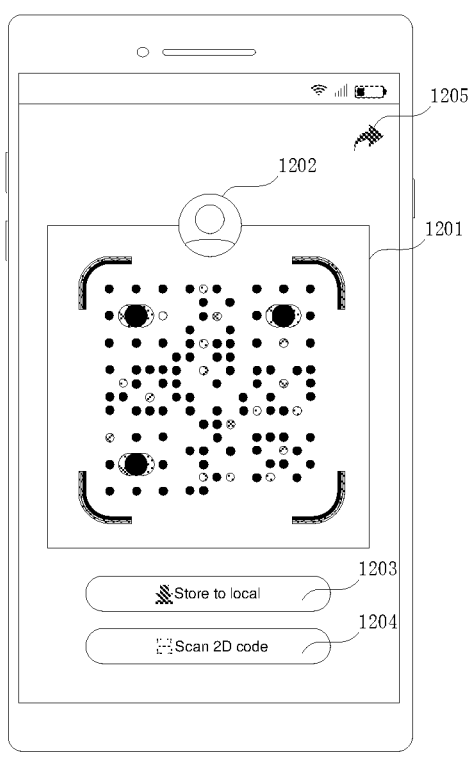
FIG. 12 is a schematic diagram of an interface for displaying a 2D code image provided by embodiments of the present disclosure.

FIG. 12 is a schematic diagram of an interface for displaying a 2D code image provided by embodiments of the present disclosure.

As shown in FIG. 12, the electronic device may display a 2D code image 1201 and a target control. A category icon 1202 of a target content may be provided on the top edge of the 2D code image 1201. The target control may include a 2D code storage control 1203, a 2D code scanning control 1204 and a 2D code sharing control 1205.

The 2D code image 1201 is similar to the 2D code image shown in FIG. 11, and will not be described herein.

The 2D code storage control 1203 can be used to locally store the 2D code image. The 2D code storage control 1203 may be a "Store to local" button. The user can click the 2D code storage control 1203 to cause the electronic device to store the 2D code image in a local target storage space of the electronic device.

The 2D code scanning control 1204 can be used to scan a 2D code image displayed by other electronic devices or a 2D code image stored locally in the electronic device. The 2D code scanning control 1204 may be a "Scan 2D code" button. The user can click the 2D code scanning control 1204 to cause the electronic device to display a 2D code scanning interface, and scan a 2D code image displayed by another electronic device in the 2D code scanning interface. The 2D code scanning interface can also include, for example, an "Album" icon. The user can click the album icon to cause the electronic device to display locally stored images. The user can click any 2D code image of the displayed images, so that the electronic device scans the user selected 2D code image stored locally on the electronic device.

The 2D code sharing control 1205 can be used to share the 2D code image to other users of the first application or to users of an application other than the first application. The 2D code sharing control 1205 may be a forward button. The user can click the 2D code sharing control 1205 to cause the electronic device to display other users in the first application, or applications other than the first application. The user can click on at least one of the other users in the first application to cause the electronic device to send the 2D code image to the other user(s) selected by the user through a window in the first application for chatting by the user with the other user(s) selected by the user. The user can also click on any of the applications other than the first application to cause the electronic device to display a sharing object such as a user or a social platform in the other application selected by the user. The user can select at least one of the sharing objects in the other application. If the sharing object in the other application selected by the user is a user, the electronic device can send the 2D code image to the selected user through a window in the other application selected by the user for chatting by the user with the selected user; if the sharing object in the other application selected by the user is a social platform, the electronic device can upload the 2D code image to the social platform of the other application selected by the user.

In still another implementation of the present disclosure, returning to FIG. 2, in S220, the electronic device may further superimpose and display the 2D code image on an interface displayed when the 2D code display operation is received.

In some embodiments, in the case where the user inputs the 2D code display operation in a display interface for the target content, after receiving the 2D code display operation, the electronic device may dispose a floating layer on the preview interface responsive to the 2D code display operation, and display the 2D code image at any position within the floating layer.

For example, the target content can be a target video, and the display interface can be a video display interface. After the user inputs a 2D code display operation in the video display interface, the electronic device can directly superimpose and display the 2D code image in the middle of the video display interface.

In some embodiments of the present disclosure, in the case that the electronic device can simultaneously display a 2D code image and a target control in response to the 2D code display operation, the electronic device can also superimpose and display the 2D code image and the target control on an interface displayed when the 2D code display operation is received. For example, a floating layer can be disposed on an interface displayed when the 2D code display operation is received, and the 2D code image and the target control can be displayed at any position within the floating layer.

Therefore, in the embodiment of the present disclosure, the electronic device can directly superimpose and display the 2D code image on the interface displayed when the 2D code display operation is received, thereby reducing the number of page jumps and improving user experience.

In still another embodiment of the present disclosure, S220 may further specifically comprises:

displaying the 2D code image on a first background image.

The first background image may be displayed in a full screen, or may be displayed at any position on the interface displayed when the 2D code display operation is received, which is not limited herein.

In some embodiments, the first background image may be a preset image. The preset image can be any image specified in advance, which is not limited herein.

In some embodiments, the first background image may be generated according to the first color.

In some examples, the first color may be a preset background color. The preset background color may be any color specified in advance, which is not limited herein.

In some other examples, the first color can also be determined according to the 2D code display operation.

For example, if the 2D code display operation is an operation for triggering display of a 2D code image corresponding to the target content for the first time, the first color may be a preset background color. The preset background color may be any color specified in advance, which is not limited herein. For another example, if the 2D code display operation is an operation for triggering the display of a 2D code image corresponding to the target content not for the first time, the first color may be a color corresponding to the background image finally selected by the user when the 2D code image was displayed last time.

Correspondingly, in these embodiments, after S220, the 2D code display method may further comprise:

receiving an image change operation for replacing the first background image with a second background image;

in response to the image change operation, replacing the first background image with the second background image for display.

A detail description will be given below according to the 2D code display method shown in FIG. 13.

Figure 13:
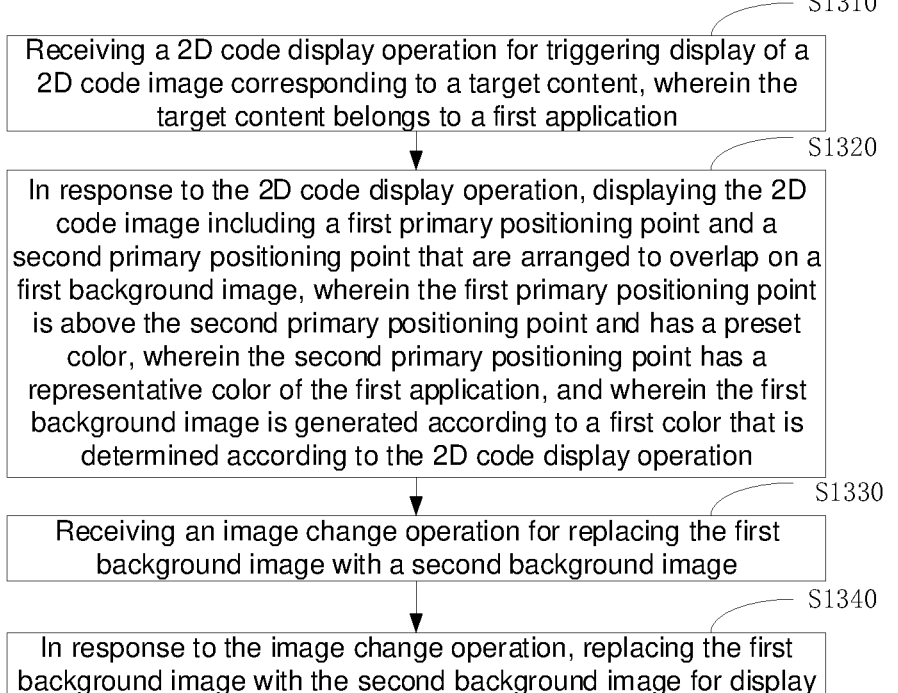
FIG. 13 is a schematic flowchart of another 2D code display method provided by embodiments of the present disclosure.

FIG. 13 is a schematic flowchart of another 2D code display method provided by embodiments of the present disclosure.

As shown in FIG. 13, the 2D code display method may include the following steps:

S1310: receiving a 2D code display operation for triggering display of a 2D code image corresponding to a target content, wherein the target content belongs to a first application.

S1310 is similar to S210 of the embodiment shown in FIG. 2, and will not be described herein.

S1320: in response to the 2D code display operation, displaying the 2D code image including a first primary positioning point a second primary positioning point that are arranged to overlap on a first background image, wherein the first primary positioning point is above the second primary positioning point and has a preset color, wherein the second primary positioning point has a representative color of the first application, and wherein the first background image is generated according to a first color that is determined according to the 2D code display operation.

In the embodiment of the present disclosure, the first color can be determined according to the 2D code display operation.

In some embodiments, if the 2D code display operation is an operation for triggering the display of the 2D code image corresponding to the target content for the first time, the first color may be a preset background color. The preset background color may be any color specified in advance, which is not limited herein.

In some other embodiments, if the 2D code display operation is an operation for triggering the display of a 2D code image corresponding to the target content not for the first time, the first color may be a color corresponding to the background image finally selected by the user when the 2D code image was displayed last time.

In the embodiments of the present disclosure, the first background image may be generated according to the first color.

In some embodiments, the first background image may be an image generated in real time according to the first color.

In some embodiments, before S1320, the 2D code display method may further comprise:

generating a first background image according to a first color.

Therefore, after receiving the 2D code display operation, the electronic device may first generate a first background image according to a first color responsive to the 2D code display operation, and then display the 2D code image on the first background image.

The 2D code image has been described in the above embodiment, and will not be described herein.

In these embodiments, the first background image may be a pure color image generated according to the first color. The first background image may also be a color gradient image obtained by performing color gradient processing on the first color according to a target color. This disclosure is not limited in this regard. The target color can be any preset color, such as white.

Further, when the first background image is a color gradient image, the color gradient center may be located inside the first background image or outside the first background image, which is not limited herein. In addition, the color gradient center can be fixedly or randomly set, which is not limited herein.

In some embodiments, after receiving the 2D code display operation, the electronic device may first fill the canvas with a first color responsive to the 2D code display operation to generate a first color background image, and then determine a color gradient center; perform color gradient processing on the first color background image based on the determined color gradient center and a target color to obtain a first background image; and then display the 2D code image on the first background image.

In some other embodiments, the first background image may be an image generated in advance according to the first color.

In some embodiments, before S1320, the 2D code display method may further comprise:

retrieving a first background image corresponding to the first color.

In some embodiments, if the 2D code display operation is an operation for triggering display of the 2D code image corresponding to the target content for the first time, the electronic device may retrieve a first background image corresponding to the first color from preset background images corresponding to respective colors stored in advance. The preset background images can be generated according to the method for generating the first background image in real time described above, which will not be described herein.

In some embodiments, in the case that one color corresponds to multiple preset background images, the electronic device may randomly select one of the preset background images corresponding to the first color, and use the selected preset background image as the first background image.

In some other embodiments, if the 2D code display operation is an operation for triggering the display of a 2D code image corresponding to the target content not for the first time, the electronic device can obtain the background image finally selected by the user when the 2D code image was displayed last time.

S1330: receiving an image change operation for replacing the first background image with a second background image.

In some embodiments of the present disclosure, the image change operation may be an operation for selecting a second background image.

The image change operation may include operations such as clicking, long pressing, double-clicking, voice control, expression control, or the like performed on a third control for triggering the display of multiple images, and an operation of selecting a second background image from the multiple images. In some embodiments, the multiple images may include at least one of local images of the electronic device and Internet images, which is not limited herein. In some embodiments, the multiple images may include at least one of static images and dynamic images such as videos, which is not limited herein.

The image change operation in these embodiments will be described below with a specific example.

Figure 14:
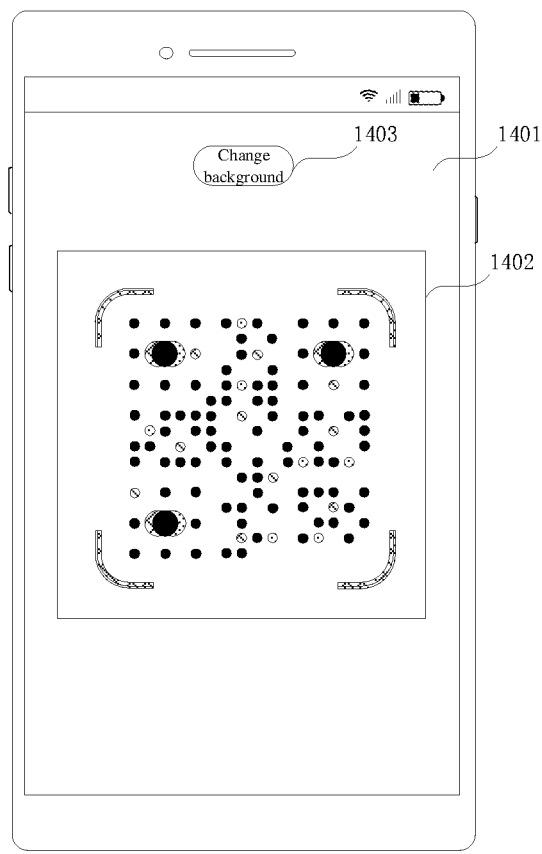
FIG. 14 is a schematic diagram of another interface for displaying a 2D code image provided by embodiments of the present disclosure.

FIG. 14 is a schematic diagram of another interface for displaying a 2D code image provided by embodiments of the present disclosure.

As shown in FIG. 14, the electronic device may display a first background image 1401 in a full screen. A 2D code image 1402 and a third control 1403 such as a "Change background" button may be superimposed and displayed on the first background image 1401. The 2D code image 1402 may be located in the middle of the first background image 1401, and the third control 1403 may be located above the 2D code image 1402.

The user can click the third control 1403 to enter an album of the electronic device, and select an image from the album as the second background image, so that the electronic device can replace the first background image 1401 with the second background image.

In some other embodiments of the present disclosure, the image change operation may also be an operation for triggering a change of the background color.

In some embodiments, a second color can be determined according to the image change operation.

In some embodiments, multiple colors may be stored in the electronic device in advance, and the image change operation may be used to select a second color.

The image change operation may include an operation such as clicking, long pressing or the like performed on a fourth control for triggering the display of multiple colors or on any display position, and an operation of selecting a second color from multiple colors.

In some other embodiments, multiple colors may be stored in the electronic device in advance, and the image change operation may be used to trigger the electronic device to select a second color.

The image change operation may include an operation such as clicking, long pressing or the like input by the user at any display position.

In some examples, the electronic device may randomly select a second color that is different from the first color from the multiple colors in response to the image change operation.

In some other examples, the electronic device may store multiple colors that are cyclically arranged in a predetermined arrangement order in advance. In response to an image change operation, the electronic device may determine a total number of image change operations received after displaying the first background image, determine a position difference between the second color and the first color based on the total number, and then select the second color after the first color from the cyclically arranged multiple colors according to this position difference.

In the embodiment of the present disclosure, the second background image may be a pure color image generated according to the second color. The second background image may also include a color gradient image corresponding to the second color. This disclosure is not limited in this regard.

S1340: in response to the image change operation, replacing the first background image with the second background image for display.

In the embodiment of the present disclosure, after receiving the image change operation, the electronic device may replace the first background image with the second background image for display in response to the image change operation.

In some embodiments, S1340 may specifically include:

expanding the second background image according to a preset radius increment with an operating position of the image change operation as a center of a circle, until the first background image is replaced by the second background image. The operating position may be the center of a touch on the display screen of the electronic device when the user inputs the image change operation.

Specifically, the electronic device may use the operating position of the image change operation as the center of a circle, gradually expand a circular display area from small to large on the first background image according to a preset radius increment, and display the image content of the corresponding position in the second background image within the circular display area until the circular display area completely covers the first background image, so that the first background image is replaced with the second background image for display.

Therefore, in the embodiment of the present disclosure, the user can further customize the background image of the 2D code image, which may further improve the user experience.

In some embodiments of the present disclosure, the second background image may be an image generated in real time according to a second color.

In some embodiments, before S1340, the 2D code display method may further comprise:

generating a second background image according to a second color.

In some embodiments, when the second background image includes a color gradient image corresponding to the second color, the color gradient image corresponding to the second background image may be generated by performing color gradient processing on the second color according to a third color. The third color may include at least one of the first color and a target color, which is not limited herein. In some embodiments, the target color can be any preset color, such as white.

In some embodiments, after receiving the image change operation, the electronic device may first fill a canvas with the second color in response to the image change operation to generate a second color background image, and then perform color gradation processing on the second color background image to obtain a second background image based on the third color, and replace the first background image with the second background image for display.

In these embodiments, In some embodiments, the electronic device may perform color gradient processing on the second color background image based on the third color according to a fixed color gradient center and a fixed gradient radius to obtain the second background image.

The fixed color gradient center can be any display position, which is not limited herein. For example, the fixed color gradient center may be a center position of the display screen of the electronic device.

Taking the fixed color gradient center being the center of the display screen of the electronic device as an example, the electronic device can fill a canvas with the same size as the display screen of the electronic device with a second color to generate a second color background image, and then perform color gradient processing on the second color background image according to a fixed gradient radius based on a third color, with the center position of the canvas as the color gradient center, to obtain a second background image with the fixed gradient radius and with the center position of the display screen as the color gradient center, so as to replace the first background image with the second background image for display.

Taking the fixed color gradient center being the center position of the display screen of the electronic device as an example, the specific method for generating the second background image in these embodiments will be described below.

Figure 15:
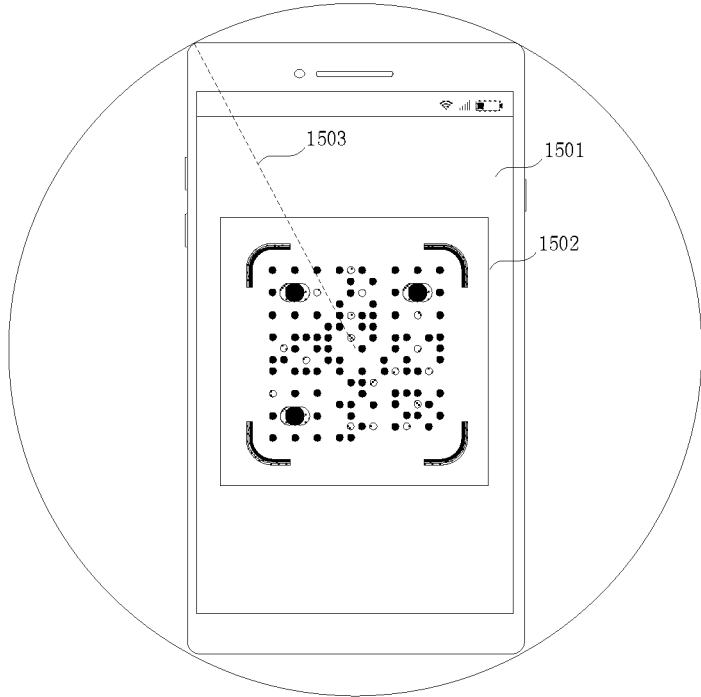
FIG. 15 is a schematic diagram showing the principle of generating a background image provided by embodiments of the present disclosure.

FIG. 15 is a schematic diagram showing the principle of generating a background image provided by embodiments of the present disclosure.

As shown in FIG. 15, the electronic device may display a first background image 1501 in a full screen. A 2D code image 1502 may be superimposed and displayed on the first background image 1501. The 2D code image 1502 may be located in the middle of the first background image 1501.

After receiving an image change operation, the electronic device can obtain a second color, and fill a canvas in the same size as the first background image with the second color to generate a second color background image, and then perform color gradient processing on the second color background image based on a third color by taking the center of the first background image 1501 as the color gradient center and half of the diagonal length of the first background image 1502 as the gradient radius 1503, so as to obtain a second background image subjected to gradient processing. In the second background image, the second color is gradually changed to the third color from the center to the surroundings.

In some other embodiments, when the second background image includes a color gradient image corresponding to a second color and the image change operation is used to trigger the electronic device to select the second color, the color gradient image corresponding to the second background image can be generated by performing color gradient processing on the second color according to operating parameters of the image change operation.

In some embodiments, the operating parameters may include at least one of an operating position, an operating duration, and an operating strength.

The operation position can be used to determine the color gradient center, the operation duration can be used to determine the color gradient radius and/or a color difference of the second color, and the operation strength can be used to determine the color gradient radius and/or a color difference of the second color.

Further, the color difference of the second color may refer to a difference between an actual color value of the second color and an initial color value. The actual color value of the second color refers to a color value at the gradient center point of the second background image, and the initial color value of the second color refers to a color value preset by the electronic device for the second color.

In some examples, when the operating parameters include an operating position, the electronic device can determine a color gradient center according to the operating position, and then perform color gradation processing on the second color background image based on a third color according to the determined color gradient center and a fixed gradient radius to obtain a second background image. The operating position may be the center of a touch on the display screen of the electronic device when the user inputs an image change operation.

Specifically, the electronic device can fill a canvas whose size is N times the size of the display screen of the electronic device (N is a positive integer, for example, N is 4) with a second color to generate a second color background image; and then perform color gradient processing on the second color background image according to a fixed gradient radius and based on a third color by taking the center position of the canvas as the color gradient center, to obtain a second color background image subjected to gradient processing; by overlapping the operating position with the center position of the canvas, and capture a second background image of the same size as the display screen from the second color background image according to a relative position of the operating position in the display screen of the electronic device, so that the relative position of the color gradient center in the second background image is the same as the relative position of the operating position in the display screen; and then replace the first background image with the second background image with a fixed gradient radius and with the operating position as the color gradient center for display.

The specific method of generating a second background image in these examples will be described below with reference to FIG. 16.

Figures 16, 17:
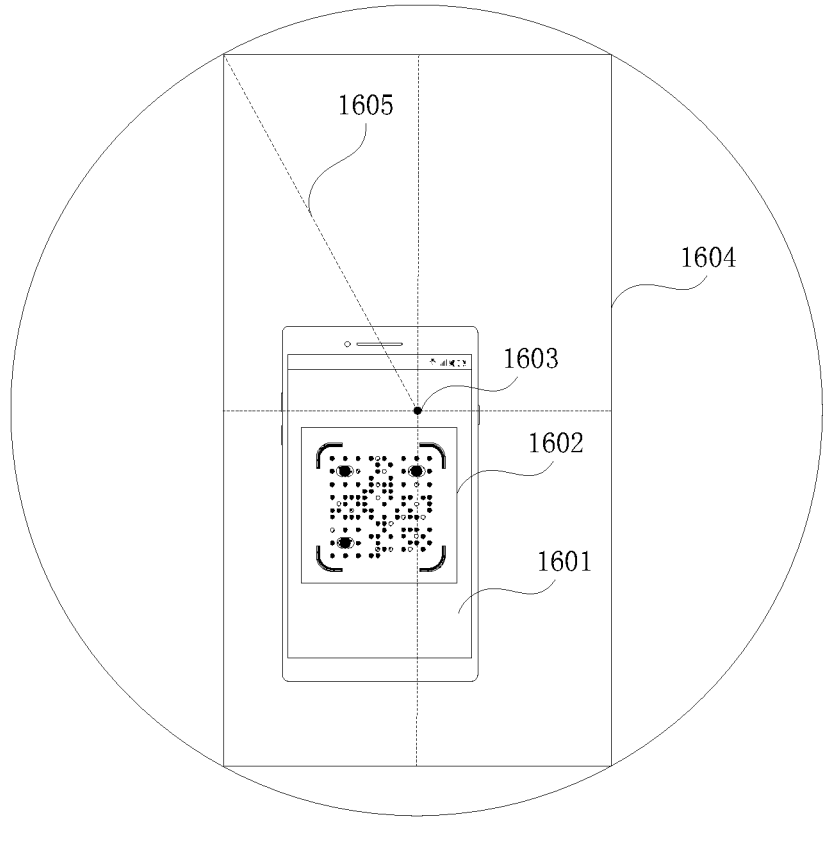
FIG. 16 is a schematic diagram showing the principle of generating another background image provided by embodiments of the present disclosure.
FIG. 17 is a schematic structural diagram of a 2D code display apparatus provided by embodiments of the present disclosure.

FIG. 16 is a schematic diagram showing the principle of generating another background image provided by embodiments of the present disclosure.

As shown in FIG. 16, the electronic device may display a first background image 1601 in a full screen. A 2D code image 1602 may be superimposed and displayed on the first background image 1601. The 2D code image 1602 may be located in the middle of the first background image 1601.

When the user clicks at a display position 1603 in the first background image 1601, the electronic device can obtain a second color and fill a canvas whose size is 4 times the size of the first background image 1601 with the second color to generate a second color background image 1604; and then by taking the center of the second color background image 1604 as the color gradient center, and half of the diagonal length of the second color background image 1604 as the gradient radius 1605, perform color gradient processing on the second color background image 1604 based on a third color to obtain the second color background image 1604 subjected to the gradient processing, in which the second color is gradually changed to the third color from the center to the surroundings. Finally, the electronic device may overlap the display position 1603 with the center of the second color background image 1604, and capture a second background image with the same size as the first background image 1601 from the second color background image 1604 subjected to the gradient processing.

In some other examples, when the image change operation includes a long press operation, the operation parameters include an operation duration and the operation duration is used to determine a color gradient radius, the electronic device can further determine a color gradient radius corresponding to the operation duration according to the corresponding relationship between the duration and the radius. Then, according to the determined color gradient radius, and based on a third color, the electronic device can perform color gradient processing on the second color background image to obtain a second background image, which will not be described herein.

In still other examples, in the case where the operating parameters include an operation strength and the operation length is used to determine a color difference of the second color, the second color background image is obtained by filling with an initial color value of a second color. The electronic device can further determine a color difference of the second color corresponding to the operation strength according to the corresponding relationship between the strength and the color difference, and then adjust the image color of the second color background image from the initial color value to the actual color value of the second color according to the color difference of the second color. Then, the electronic device can perform color gradient processing on the second color background image subjected to the image color adjustment based on a third color to obtain a second background image, which will not be described herein.

In some other embodiments of the present disclosure, the second background image may be an image generated in advance according to the second color.

In some embodiments, before S1340, the 2D code display method may further comprise:

retrieving a second background image corresponding to the second color.

Specifically, the electronic device may retrieve a second background image corresponding to the second color from preset background images corresponding to respective colors stored in advance. The preset background images can be generated according to the method for generating the first background image in real time described above, which will not be described herein.

In some embodiments, in the case that one color corresponds to multiple preset background images, the electronic device may randomly select one of the preset background images corresponding to the second color, and use the selected preset background image as the second background image.

Therefore, in the embodiment of the present disclosure, the users' requirements for customization can be further satisfied, and user experience can be improved.

The embodiments of the present disclosure further provide a 2D code display apparatus, which will be described below with reference to FIG. 17.

In the embodiments of the present disclosure, the 2D code display apparatus may be an electronic device. In some embodiments, the electronic device may be the electronic device 101 in the client shown in FIG. 1. The electronic device may be a mobile phone, tablet computer, desktop computer, notebook computer, vehicle-mounted terminal, wearable electronic device, all-in-one computer, smart home device, and other device with a communication function, or a device simulated on a simulator or a virtual machine.

FIG. 17 is a schematic structural diagram of a 2D code display apparatus provided by embodiments of the present disclosure.

As shown in FIG. 17, the 2D code display apparatus 1700 may include a first receiving unit 1710 and a first display unit 1720.

The first receiving unit 1710 may be configured to receive a 2D code display operation for triggering display of a 2D code image corresponding to a target content, wherein the target content belongs to a first application.

The first display unit 1720 may be configured to, in response to the 2D code display operation, display the 2D code image including a first primary positioning point and a second primary positioning point that are arranged to overlap, wherein the first primary positioning point is above the second primary positioning point and has a preset color, and wherein the second primary positioning point has a representative color of the first application.

In the embodiment of the present disclosure, a 2D code image corresponding to a target content in a first application can be displayed based on a 2D code display operation. The 2D code image may include a first primary positioning point and a second primary positioning point that are arranged to overlap, wherein the first primary positioning point is above the second primary positioning point and has a preset color, and wherein the second primary positioning point has a representative color of the first application, so that the 2D code has a representative color of the first application, thereby capable of reflecting a style unique to the first application through the representative color, and improving the recognizability of the 2D code.

In some embodiments of the present disclosure, the 2D code image may further include auxiliary positioning points, which can be evenly arranged around the first and second primary positioning points that are arranged to overlap.

In some embodiments of the present disclosure, the representative color may include a first-type color whose binarized color is the same as the preset color.

Correspondingly, the auxiliary positioning points may comprise first auxiliary positioning points that may have the preset color and second auxiliary positioning points that may have the first-type color.

In some embodiments of the present disclosure, the 2D code image may further comprise a data point matrix. The data point matrix may include first data points that may have the preset color and second data points that may have the representative color.

Correspondingly, the data point matrix may be generated according to the target content, and may be used to enable a second application to obtain the target content. The second application may comprise at least one of the first application and an application other than the first application.

In some embodiments of the present disclosure, the representative color may include a first-type color whose binarized color may be the same as the preset color, and a second-type color whose binarized color may be different from the preset color.

Correspondingly, the second data points may comprise first-type second data points that may have the first-type color and second-type second data points that may have the second-type color. The first data points and the first-type second data points may be generated according to the target content.

In some embodiments of the present disclosure, the 2D code image may further comprise an image frame that may be generated according to the representative color.

In some embodiments of the present disclosure, the first display unit 1720 may be further configured to display the 2D code image on a first background image that may be generated according to a first color.

Correspondingly, the 2D code display apparatus 1700 may further comprise a second receiving unit and a second display unit.

The second receiving unit may be configured to receive an image change operation, which may be used for replacing the first background image with a second background image.

The second display unit may be configured to replace the first background image with the second background image for display, in response to the image change operation.

In some embodiments of the present disclosure, the second display unit may be further configured to expand the second background image according to a preset radius increment with an operating position of the image change operation as the center of a circle, until the first background image is replaced by the second background image.

In some embodiments of the present disclosure, the second background image may comprise a color gradient image corresponding to the second color.

In some embodiments of the present disclosure, the color gradient image may be generated by performing a color gradient process on the second color according to a third color. The third color may comprise at least one of the first color and a target color.

In some embodiments of the present disclosure, the color gradient image may be generated by performing a color gradient process on the second color according to operation parameters of an image change operation. The operation parameters may include at least one of an operation position, an operation duration, and an operation strength.

In some embodiments of the present disclosure, the 2D code display apparatus 1700 may further comprise a third display unit, which may be configured to display a target control in response to the 2D code display operation.

The target control may include at least one of a 2D code storage control, a 2D code scanning control, and a 2D code sharing control.

It should be noted that the 2D code display apparatus 1700 shown in FIG. 17 can execute the various steps of the method embodiments shown in FIGS. 2 to 16, and implement the various processes and effects of the method embodiments shown in FIGS. 2 to 16, which will not be repeated herein.

The technical solution provided in the embodiments of the present disclosure has the following advantages over the related art:

The 2D code display method, apparatus, device, and medium according to the embodiments of the present disclosure may display a 2D code image corresponding to a target content in a first application based on a 2D code display operation, and the 2D code image may include a first primary positioning point and a second primary positioning point that are arranged to overlap, wherein the first primary positioning point is above the second primary positioning point and has a preset color, and wherein the second primary positioning point has a representative color of the first application, so that the 2D code has the representative color of the first application, thereby capable of reflecting a style unique to the first application through the representative color, and improving the recognizability of the 2D code.

Figure 18:
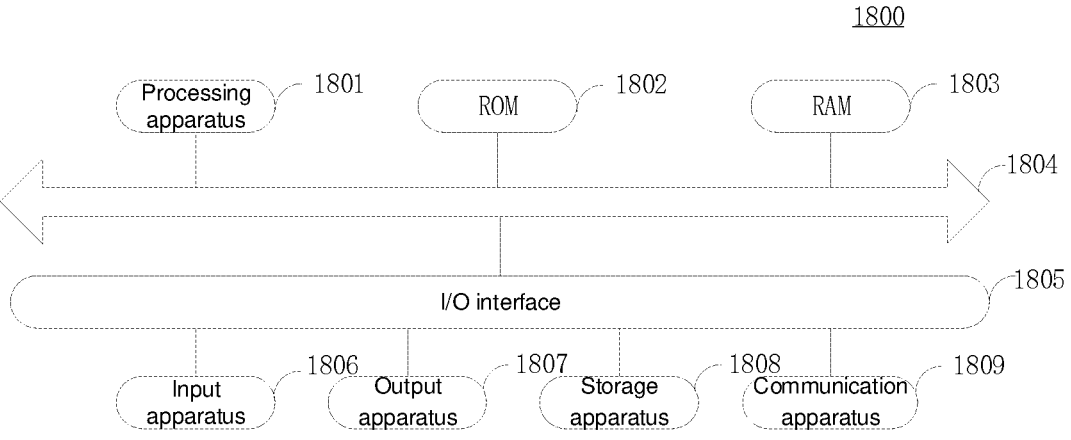
FIG. 18 is a schematic structural diagram of an electronic device provided by embodiments of the present disclosure.

Embodiments of the present disclosure further provides an electronic device, which may include a processor and a memory. The memory may be used for storing executable instructions. The processor can read the executable instructions from the memory and perform the executable instructions to implement the 2D code display method described in the above embodiments. FIG. 18 is a schematic structural diagram of an electronic device provided by embodiments of the present disclosure. Reference will be made to FIG. 18, which shows a schematic structural diagram suitable for implementing an electronic device 1800 in embodiments of the present disclosure.

The electronic device 1800 in the embodiment of the present disclosure may include, but is not limited to, a mobile terminal, such as a mobile phone, a notebook computer, a digital broadcast receiver, a personal digital assistant (PDA), a pad, a portable multimedia player (PMP), a vehicle-mounted terminal (such as a vehicle-mounted navigation terminal), a wearable device, etc., or a fixed terminal such as a digital TV, a desktop computer, a smart home device, etc.

It should be noted that the electronic device 1800 shown in FIG. 18 is only an example, and should not limit the function and scope of use of the embodiments of the present disclosure.

As shown in FIG. 18, the electronic device 1800 may include a processing apparatus (such as a central processing unit, a graphics processor, etc.) 1801, which can perform various appropriate actions and processes according to a program stored in a read only memory (ROM) 1802, or a program loaded from a storage apparatus 1808 into a random access memory (RAM) 1803. The RAM 1803 also has various programs and data required for the operations of the electronic device 1800 stored therein. The processing apparatus 1801, ROM 1802, and RAM 1803 are connected to each other through a bus 1804. An input/output (I/O) interface 1805 is also connected to the bus 1804.

Generally, the following apparatuses can be connected to the I/O interface 1805: input apparatuses 1806 including, for example, a touch screen, a touch pad, a keyboard, a mouse, a camera, a microphone, an accelerometer, a gyroscope, etc.; output apparatuses 1807 including, for example, a liquid crystal display (LCD), a speaker, a vibrator, etc.; a storage apparatus 1808 including, for example, a magnetic tape, a hard disk, etc.; and a communication apparatus 1809.

The communication apparatus 1809 may allow the electronic device 1800 to perform wireless or wired communication with other devices to exchange data. Although FIG. 18 shows an electronic device 1800 having various apparatuses, it should be understood that it is not required to implement or provide all the illustrated apparatuses. Alternatively, more or fewer apparatuses can be implemented or provided.

Some embodiments of the present disclosure further provides a computer readable storage medium storing a computer program thereon, which when executed by a processor, causes the processor to implement the 2D code display method described in the above embodiments.

In particular, according to some embodiments of the present disclosure, the processes described above with reference to the flowcharts can be implemented as computer software programs. For example, some embodiments of the present disclosure include a computer program product, which includes a computer program carried on a nontransitory computer readable medium, and the computer program contains program code for executing the method shown in the flowcharts.

In such embodiments, the computer program may be downloaded and installed from a network through the communication apparatus 1809, or installed from the storage apparatus 1808, or installed from the ROM 1802. When the computer program is executed by the processing apparatus 1801, the above functions defined in the 2D code display method of the embodiment of the present disclosure are performed.

It should be noted that the above computer-readable medium in the present disclosure may be a computer-readable signal medium or a computer-readable storage medium, or any combination thereof. The computer readable storage medium can be, for example, but not limited to, an electronic, magnetic, optical, electromagnetic, infrared, or semiconductor system, apparatus, or device, or any combination thereof. More specific examples of the computer readable storage medium may include, but are not limited to: electrical connection with one or more wires, portable computer magnetic disk, hard disk, random access memory (RAM), read only memory (ROM), erasable programmable read only memory (EPROM or flash), fiber optics, portable compact disk read only memory (CD-ROM), optical storage device, magnetic storage device, or any suitable combination thereof. In the present disclosure, a computer readable storage medium can be any tangible medium that can contain or store a program, which can be used by or in combination with an instruction execution system, apparatus or device. In the present disclosure, a computer readable signal medium may include a data signal that is propagated in the baseband or as part of a carrier wave, and computer readable program code is carried therein. Such propagated data signals can take a variety of forms including, but not limited to, electromagnetic signals, optical signals, or any suitable combination thereof. The computer readable signal medium can also be any computer readable medium other than a computer readable storage medium, which can transmit, propagate, or transport a program for use by or in combination with the instruction execution system, apparatus, or device. Program code included on a computer readable medium can be transmitted by any suitable medium, including but not limited to wire, fiber optic cable, radio frequency (RF), etc., or any suitable combination thereof.

In some implementations, a client and a server can communicate using any currently known or future developed network protocol such as HTTP, and can be interconnected by any form or medium of digital data communication, e.g., a communication network. Examples of communication networks include a local area network ("LAN"), a wide area network ("WAN"), an internet (e.g., the Internet), and an end-to-end network (for example, and ad hoc end-to-end network), as well as any currently known or future developed networks.

The above computer-readable medium may be included in the electronic device described above; or it may exist alone without being assembled into the electronic device.

The above computer-readable medium carries one or more programs, which when executed by an electronic device, cause the electronic device to:

receive a 2D code display operation for triggering display of a 2D code image corresponding to a target content, wherein the target content belongs to a first application;

in response to the 2D code display operation, display the 2D code image including a first primary positioning point and a second primary positioning point that are arranged to overlap, wherein the first primary positioning point is above the second primary positioning point and has a preset color, and wherein the second primary positioning point has a representative color of the first application.

In the present disclosure, the computer program code for executing operations of the present disclosure may be written in one or more programming languages or any combination thereof.

The programming languages include, but are not limited to, object-oriented programming languages, such as Java, Smalltalk, C++, etc, as well as conventional procedural programming languages, such as "C" programming language or similar programming languages. A program code may be completely or partly executed on a user computer, or executed as a standalone software package, partly executed on the user computer and partly executed on a remote computer, or completely executed on a remote computer or server. In the circumstance where a remote computer is involved, the remote computer may be connected to the user computer through various kinds of networks, including local area network (LAN) or wide area network (WAN), or may be connected to an external computer (for example using an Internet service provider via Internet).

The flowcharts and block diagrams in the accompanying drawings illustrate the architecture, functionality, and operation of possible implementations of systems, methods and computer program products according to various embodiments of the present disclosure. In this regard, each block in the flowcharts or block diagrams may represent a module, program segment, or a portion of code, which comprises one or more executable instructions for implementing the specified logical functions. It should also be noted that, in some alternative implementations, the functions noted in the blocks may occur in a different order from the order noted in the figures. For example, two blocks shown in succession may be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented with special purpose hardware-based systems that perform the specified functions or operations, or combinations of special purpose hardware and computer instructions.

The units involved in the embodiments described in the present disclosure can be implemented in software or in hardware. The names of the units do not constitute a limitation on the units themselves under certain circumstances.

The functions described above may be performed at least in part by one or more hardware logic components. For example, exemplary types of hardware logic components that can be used include, but are not limited to: Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium may be a tangible medium, which may contain or store a program for use by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include electrical connection based on one or more wires, portable computer disk, hard disk, random access memory (RAM), read only memory (ROM), erasable programmable read only memory (EPROM or flash), fiber optics, portable compact disk read only memory (CD-ROM), optical storage device, magnetic storage device, or any suitable combination thereof.

The above description is only preferred embodiments of the present disclosure and an explanation of the applied technical principles. Those skilled in the art should understand that the scope of disclosure involved in this disclosure is not limited to the technical solutions formed by the specific combinations of the above technical features, and should also cover other technical solutions (for example, technical solutions formed by replacing the above features with technical features having similar functions to those disclosed in the present disclosure (but not limited to such features)) formed by any combination of the above technical features or their equivalent features without departing from the concept of the disclosure.

In addition, although the operations are depicted in a specific order, this should not be understood as requiring these operations to be performed in the specific order shown or performed in a sequential order. Under certain circumstances, multi-tasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

Although the subject matter has been described in a language specific to structural features and/or logical actions of the method, it should be understood that the subject matter defined in the appended claims is not necessarily limited to the specific features or actions described above. On the contrary, the specific features and actions described above are merely exemplary forms for implementing the claims.

What is claimed is:

1. A two-dimensional (2D) code display method for information sharing, comprising:

receiving a 2D code display operation for triggering display of a 2D code image corresponding to a target item, wherein the target item belongs to a first application and corresponds to information to be shared;

generating, via an electronic device, the 2D code image based on the target item, the 2D code image comprising a first primary positioning point and a second primary positioning point that are arranged to overlap, wherein the first primary positioning point is above the second primary positioning point and has a preset color, and the second primary positioning point has a representative color of the first application, wherein the representative color comprises a first-type color, and a binarized color obtained by binarizing the first-type color is the same as the preset color, wherein the generating the 2D code image comprises:

generating an initial data point matrix, in which each data point is in the preset color, according to the target item, randomly selecting a preset ratio of data points from the initial data points and converting the selected data points from the preset color to the representative color, so that the data point matrix has the first data points having the preset color and the second data points having the representative color, and disposing, at at least one preset vertex of the 2D code image based on the data point matrix, the first primary positioning point and the second primary positioning point, and in response to the 2D code display operation, superimposing and displaying the 2D code image on an interface displayed when the 2D code display operation is received, via a display screen of the electronic device, wherein the data point matrix in the 2D code image, when scanned or recognized by a second application, enables the second application to switch to the first application for the target item.

2. The method according to claim 1, wherein the 2D code image further includes auxiliary positioning points that are evenly arranged around the first and second primary positioning points that are arranged to overlap.

3. The method according to claim 2, wherein, the auxiliary positioning points comprise a first auxiliary positioning point having the preset color and a second auxiliary positioning point having the first-type color.

4. The method according to claim 1, wherein the second application comprises at least one of the first application and an application other than the first application.

5. The method according to claim 1, wherein the representative color comprises a second-type color, and a binarized color obtained by binarizing the second-type color is different from the preset color; and wherein, the second data points comprise first-type second data points and second-type second data points, the first-type second data points have the first-type color, the second-type second data points have the second-type color, and the first data points and the first-type second data points are generated according to the target item.

6. The method according to claim 1, wherein the 2D code image further includes an image frame that is generated in accordance with the representative color.

7. The method according to claim 1, wherein said displaying the 2D code image comprises:

displaying the 2D code image on a first background image that is generated according to a first color;

wherein, after displaying the 2D code image, the method further comprises:

receiving an image change operation for replacing the first background image with a second background image; and in response to the image change operation, replacing the first background image with the second background image for display.

8. The method according to claim 7, wherein said replacing the first background image with the second background image for display comprises:

expanding the second background image according to a preset radius increment with an operating position of the image change operation as a center of a circle, until the first background image is replaced by the second background image.

9. The method according to claim 7, wherein the second background image comprises a color gradient image corresponding to a second color.

10. The method according to claim 9, wherein the color gradient image is generated by performing a color gradient process on the second color according to a third color, the third color comprising at least one of the first color and a target color.

11. The method according to claim 9, wherein the color gradient image is generated by performing a color gradient process on the second color according to operation parameters of the image change operation, the operation parameters including at least one of an operation position, an operation duration, and an operation strength.

12. The method according to claim 1, wherein after receiving the 2D code display operation, the method further comprises:

displaying a target control in response to the 2D code display operation;

wherein, the target control includes at least one of a 2D code storage control, a 2D code scanning control, and a 2D code sharing control.

13. A two-dimensional (2D) code display apparatus for information sharing, comprising:

a first receiving unit configured to receive a 2D code display operation for triggering display of a 2D code image corresponding to a target item, wherein the target item belongs to a first application and corresponds to information to be shared;

a unit configured to generate, via an electronic device, the 2D code image based on the target item, the 2D code image comprising a first primary positioning point and a second primary positioning point that are arranged to overlap, wherein the first primary positioning point is above the second primary positioning point and has a preset color, and the second primary positioning point has a representative color of the first application, wherein the representative color comprises a first-type color, and a binarized color obtained by binarizing the first-type color is the same as the preset color, wherein the unit configured to generate the 2D code image is further configured to:

generate an initial data point matrix, in which each data point is in the preset color, according to the target item, randomly select a preset ratio of data points from the initial data points and converting the selected data points from the preset color to the representative color, so that the data point matrix has the first data points having the preset color and the second data points having the representative color, and dispose, at at least one preset vertex of the 2D code image based on the data point matrix, the first primary positioning point and the second primary positioning point, and a first display unit configured to, in response to the 2D code display operation, superimposing and display the 2D code image on an interface displayed when the 2D code display operation is received, via a display screen of the electronic device, wherein the data point matrix in the 2D code image, when scanned or recognized by a second application, enables the second application to jump to the first application to obtain the target item.

14. An electronic device, comprising:

a processor; and a memory for storing executable instructions;

wherein, the processor is configured to read the executable instructions from the memory and perform the executable instructions to implement operations comprising:

receiving a 2D code display operation for triggering display of a 2D code image corresponding to a target item, wherein the target item belongs to a first application and corresponds to information to be shared;

generating, via an electronic device, the 2D code image based on the target item, the 2D code image comprising a first primary positioning point and a second primary positioning point that are arranged to overlap, wherein the first primary positioning point is above the second primary positioning point and has a preset color, and the second primary positioning point has a representative color of the first application, wherein the representative color comprises a first-type color, and a binarized color obtained by binarizing the first-type color is the same as the preset color, wherein the generating the 2D code image comprises:

generating an initial data point matrix, in which each data point is in the preset color, according to the target item, randomly selecting a preset ratio of data points from the initial data points and converting the selected data points from the preset color to the representative color, so that the data point matrix has the first data points having the preset color and the second data points having the representative color, and disposing, at at least one preset vertex of the 2D code image based on the data point matrix, the first primary positioning point and the second primary positioning point, and in response to the 2D code display operation, superimposing and displaying the 2D code image on an interface displayed when the 2D code display operation is received, via a display screen of the electronic device, wherein the data point matrix in the 2D code image, when scanned or recognized by a second application, enables the second application to jump to the first application to obtain the target item.

\* \* \* \* \*